(12) United States Patent
Kishimoto et al.

(10) Patent No.: US 11,601,298 B2
(45) Date of Patent: Mar. 7, 2023

(54) APPARATUS REGISTRATION METHOD, PROGRAM FOR IMPLEMENTING THE METHOD AND APPARATUS SYSTEM

(71) Applicant: Panasonic Intellectual Property Management Co., Ltd., Osaka (JP)

(72) Inventors: Akihiro Kishimoto, Osaka (JP); Shojiro Kido, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 185 days.

(21) Appl. No.: 15/989,831

(22) Filed: May 25, 2018

(65) Prior Publication Data

US 2018/0351759 A1    Dec. 6, 2018

(30) Foreign Application Priority Data

May 31, 2017    (JP) .............................. JP2017-107620

(51) Int. Cl.
*H04L 12/28*        (2006.01)
*H04L 41/08*        (2022.01)
(Continued)

(52) U.S. Cl.
CPC ....... *H04L 12/2807* (2013.01); *G06Q 10/087* (2013.01); *H04L 12/282* (2013.01);
(Continued)

(58) Field of Classification Search
CPC ....... G06K 19/06028; G06K 19/06037; G06K 7/1439; G06K 19/06; H05B 37/0272;
(Continued)

(56) References Cited

U.S. PATENT DOCUMENTS

| 2014/0152188 A1* | 6/2014 | Bora ...................... H05B 45/20 315/210 |
| 2015/0028096 A1* | 1/2015 | Kim .................. G06K 19/06028 235/375 |
| 2017/0245351 A1* | 8/2017 | Leinen ................... H05B 47/11 |

FOREIGN PATENT DOCUMENTS

| JP | 2007066584 A | 3/2007 |
| JP | 2008243749 A | 10/2008 |

(Continued)

*Primary Examiner* — Joseph E Avellino
*Assistant Examiner* — Mon Cheri S Davenport
(74) *Attorney, Agent, or Firm* — McDermott Will & Emery LLP

(57) ABSTRACT

There are provided an apparatus registration method capable of efficiently associating specific information about apparatuses and arrangement information about the apparatuses stored in an operation terminal, a program for implementing the method, and an apparatus system. A method for registration of luminaires associates a plurality of luminaires with items of arrangement information about the luminaires stored in an operation terminal for operating the luminaires. The method for registration of luminaires is adapted to include the steps of: consecutively reading at least two or more of items of specific information about the luminaires included in the luminaires using a RF reader; storing items of arrangement information about the luminaires into the operation terminal; and consecutively associating the at least two or more items of specific information consecutively read by the RF reader with at least two or more items of arrangement information among the items of arrangement information about the luminaires.

18 Claims, 19 Drawing Sheets

(51) Int. Cl.
  *H04L 41/22* (2022.01)
  *G06Q 10/087* (2023.01)
  *G06K 7/10* (2006.01)

(52) U.S. Cl.
  CPC ...... *H04L 41/0883* (2013.01); *H04L 41/0889* (2013.01); *H04L 41/22* (2013.01); *G06K 7/10297* (2013.01); *H04L 2012/2841* (2013.01)

(58) Field of Classification Search
  CPC ......... G02B 5/20; G02F 1/1335; G03F 7/105; H04Q 9/04
  See application file for complete search history.

(56) References Cited

FOREIGN PATENT DOCUMENTS

| | | |
|---|---|---|
| JP | 2015-026615 A | 2/2015 |
| JP | 2017027960 A | 2/2017 |

* cited by examiner

APPARATUS REGISTRATION METHOD, PROGRAM FOR IMPLEMENTING THE METHOD AND APPARATUS SYSTEM

CROSS REFERENCE TO RELATED APPLICATION

The entire disclosure of Japanese Patent Application No. 2017-107620 filed on May 31, 2017, including the specification, claims, drawings and abstract, is incorporated herein by reference in its entirety.

TECHNICAL FIELD

The present disclosure relates to an apparatus registration method, a program for implementing the method, and an apparatus system.

BACKGROUND

At the time of controlling apparatuses attached to a building, for example, luminaires, air-conditioning apparatuses, sensors and the like by an operation terminal, it is necessary to connect the apparatuses and the operation terminal via wired or wireless communication. Here, if a lot of apparatuses exist, it is necessary to register an ID (identification) and address of each of the apparatuses with the operation terminal to control the apparatus.

For example, in registration with an operation terminal described in Japanese Unexamined Patent Application Publication No. 2015-26615 A, map information including information about luminaires relative to installation space is stored into the operation terminal first, and a position at which a luminaire to be registered is installed is selected on the map. Next, code information about the luminaire is acquired by a receiver, and specific communication address information is read from the code information. After that, registration is performed by matching the specific address information about the luminaire with information about the position selected on the map to store the position information and the specific address information. When the registration is completed, lighting control of the luminaire can be executed by the operation terminal.

SUMMARY

The work of selecting a position at which a luminaire to be registered is installed on a map and the work of matching specific address information about the luminaire with the information about the position selected on the map must be executed for each apparatus. Therefore, as the number of apparatuses to be registered increases, more time and labor are required.

Therefore, it is an advantage of the present disclosure to provide an apparatus registration method capable of efficiently associating specific information about apparatuses with arrangement information about the apparatuses stored in an operation terminal, a program for implementing the method, and an apparatus system.

In order to solve the above problem, an apparatus registration method in an aspect of the present disclosure is an apparatus registration method for associating a plurality of apparatuses with a plurality of items of arrangement information about the plurality of apparatuses stored in an operation terminal operating the apparatuses. The method includes the steps of: consecutively reading at least two or more of items of specific information about the plurality of apparatuses included in the plurality of apparatuses using a reading apparatus; storing the plurality of items of arrangement information into the operation terminal; and consecutively associating the at least two or more items of specific information read by the reading apparatus with at least two or more of the plurality of items of arrangement information.

Further, an apparatus registration method in another aspect of the present disclosure is an apparatus registration method for associating a plurality of apparatuses with a plurality of items of arrangement information about the plurality of apparatuses stored in an operation terminal operating the apparatuses. The method includes the steps of: consecutively reading at least two or more of items of specific information about the plurality of apparatuses included in the plurality of apparatuses using a reading apparatus; storing the plurality of items of arrangement information into the operation terminal; and associating the at least two or more items of specific information read by the reading apparatus with at least two or more items of arrangement information about a same group constituted by at least two or apparatuses included among the plurality of apparatuses.

Further, a program of the present disclosure is a program causing a computer to execute a process for associating a plurality of apparatuses with a plurality of items of arrangement information about the plurality of apparatuses stored in an operation terminal operating the apparatuses. The program causes the computer to execute either a process for simultaneously associating two or more of items of specific information with two or more of the plurality of items of arrangement information stored in the operation terminal or a process for consecutively associating two or more of the items of specific information with two or more of the plurality of items of arrangement information for which association order is specified, in the association order, the two or more of the items of specific information being included in the plurality of apparatuses, each of the apparatuses having one of the items of specific information, the two or more of the items of specific information being inputted to the operation terminal.

According to the present disclosure, it is possible to efficiently associate items of specific information about apparatuses and items of arrangement inform on about the apparatuses stored in an operation terminal.

BRIEF DESCRIPTION OF DRAWINGS

The figures depict one or more implementations in accordance with the present teachings, by way of example only, not by way of limitations. In the figures, like reference numerals refer to the same or similar elements.

DESCRIPTION OF EMBODIMENTS

Embodiments according to the present disclosure will be described below in detail with reference to accompanying drawings. It is originally assumed that, when a plurality of embodiments, modifications and the like are included below, characteristic parts thereof are appropriately combined to construct a new embodiment. Further, apparatuses may be a plurality of apparatuses of any kind that are arranged in a room, a building, a facility or the like and are, for example, luminaires, air-conditioning apparatuses, sprinklers, sensors or the like. Description will be given below on a case where the apparatuses are luminaires, as an example.

First Embodiment

Figure 1:
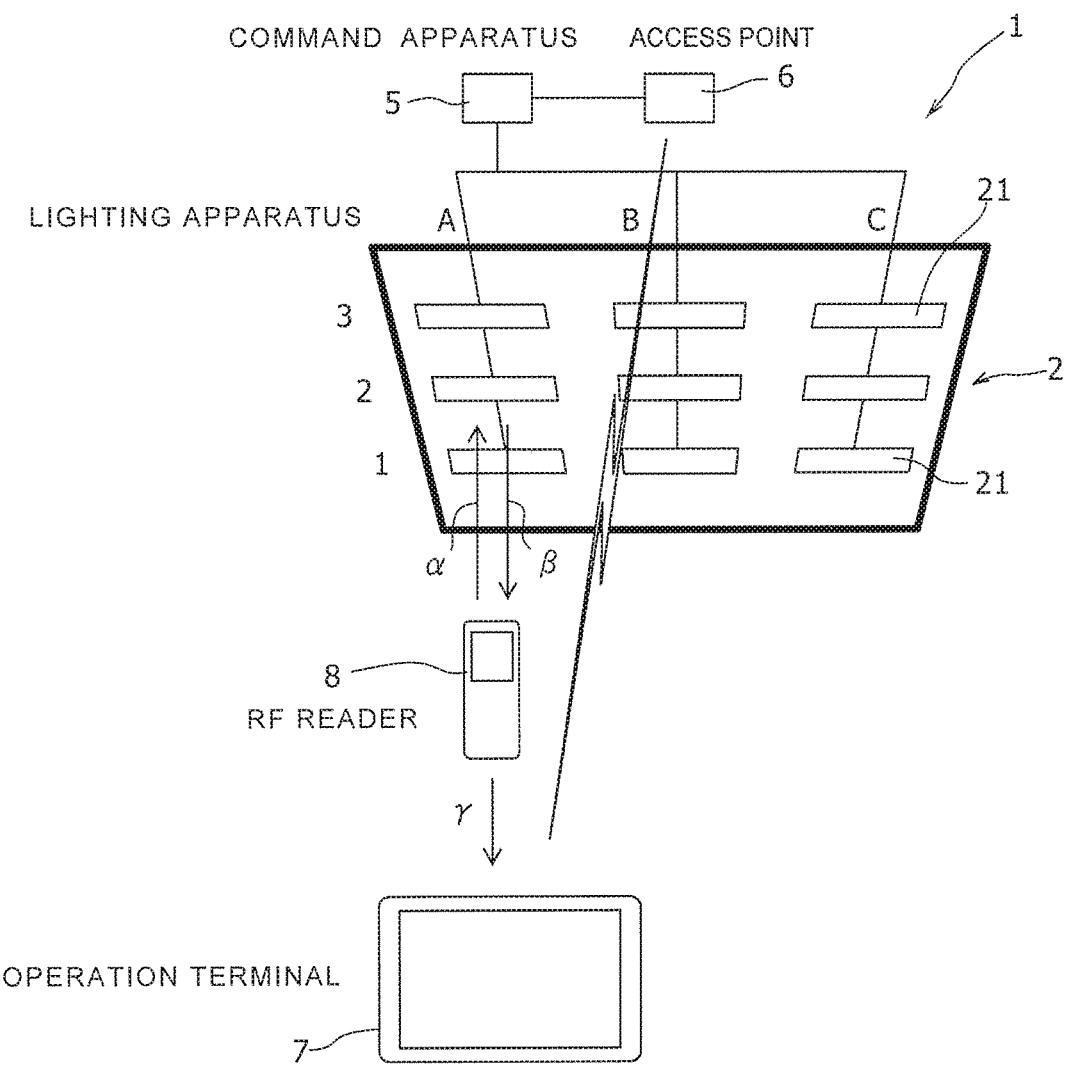
FIG. 1 is a diagram illustrating an outline of a lighting system capable of using an apparatus registration method according to a first embodiment of the present disclosure.

FIG. 1 is a diagram illustrating an outline of a lighting system 1 capable of using a method for registration of luminaires 21 according to a first embodiment of the present disclosure. As shown in FIG. 1, the lighting system 1 is provided with a lighting apparatus 2 and an operation terminal 7. The lighting system 1 is an example of an apparatus system. The lighting apparatus 2 includes nine luminaires 21, and the plurality of luminaires 21 are arranged on a ceiling of a room in a 3×3 matrix. The luminaires 21 are given marks of A1, A2, A3, B1, . . . , C2 and C3, combinations of an alphabet letter and a number, respectively.

Figure 2A:
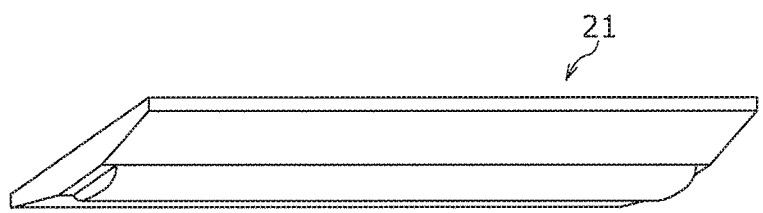
FIG. 2A is a diagram illustrating a configuration of a luminaire included in the lighting system and is a perspective view of the luminaire.
Figure 2B:
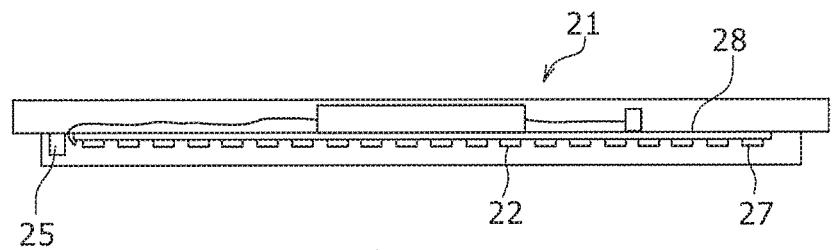
FIG. 2B is a diagram illustrating the configuration of the luminaire included in the lighting system and is a front view showing the luminaire in a state where a part thereof is cut off.
Figure 2C:
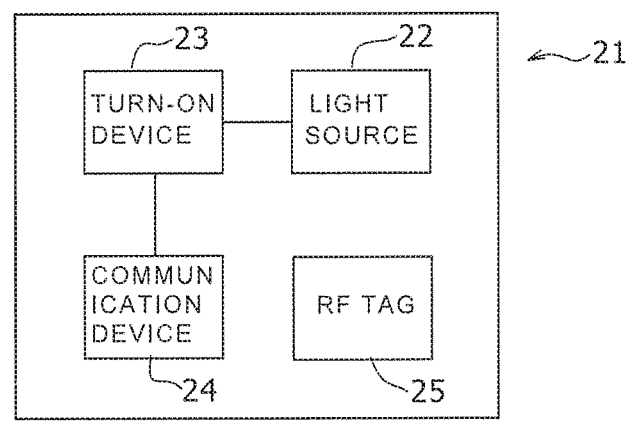
FIG. 2C is a diagram illustrating the configuration of the luminaire included in the lighting system and is a block diagram of main components of the luminaire.

FIG. 2A is a perspective view of each luminaire 21, and FIG. 2B is a front view showing the luminaire 21 in a state where a part of the luminaire 21 is cut away. Further, FIG. 2C is a block diagram of main components of the luminaire 21. As shown in FIG. 2B, the luminaire 21 has a configuration in which a plurality of light sources 22 are arranged, and a light emitting surface has a shape that is long in one direction. The luminaire, however, may be a downlight having a circular light emitting surface or the like. Further, as shown in FIG. 2C, the luminaire 21 includes the light sources 22, a turn-on device 23 for turning on the light sources 22, a communication device 24 configured with, for example, a Wi-Fi device, a Bluetooth (registered trademark) device or the like, and an RF (radio frequency) tag 25. Each light source 22 includes, for example, a light emitting diode (hereinafter referred to as LED) chip. The light sources 22 and the communication device 24 are electrically connected to the turn-on device 23. As shown in FIG. 2B, an LED board 27 composed of a board having LEDs mounted thereon, which are the light sources 22, is attached to a sheet metal part 28, and the RF tag 25 is attached on a side of the sheet metal part 28 with adhesive or the like. The RF tag 25 may be attached to any position of the luminaire 21. In a memory of the RF tag 25, an address of the communication device 24, which is specific information about the luminaire 21, is stored in advance.

Referring to FIG. 1 again, a control signal is transmitted to the lighting apparatus 2 from a command apparatus 5. Specifically, the command apparatus 5 is connected to an access point 6 via Ethernet (registered trademark) and electrically connected to the communication devices 24 (see FIG. 2C) of the luminaires 21 via a dedicated line. The command apparatus 5 transmits the control signal transmitted from the operation terminal 7 via the access point 6 to the lighting apparatus 2.

The operation terminal 7 controls the nine luminaires 21 and includes various applications installed thereon. Using these applications, turn-on and turnoff of the luminaires 21, dimming of light emitted by the luminaires 21 and the like can be executed on the operation terminal 7. The operation terminal 7 is wirelessly connected to the access point 6. By transmitting a control signal from the operation terminal 7 to the access point 6, the command apparatus 5 and the lighting apparatus 2, the luminaires 21 can be turned on or off, and dimming of light from the luminaires 21 can be performed. Further, it is preferable if light emission intensity of the luminaires 21 can be adjusted by operating the operation terminal 7.

It is necessary for the operation terminal 7 to recognize an address of each of the luminaires 21 to individually control the luminaires 21. Therefore, an RF reader 8 as an example of a reading apparatus is used for the operation terminal 7 to acquire the addresses of the luminaires 21. By exchange of signals between the RF reader 8 and each luminaire 21 indicated by arrows α and β, an ID of the RF tag 25 (see FIG. 2C) attached to the luminaire 21 and the address of the communication device 24 stored in the memory of the luminaire 21 are read by the RF reader 8.

Figure 3A:
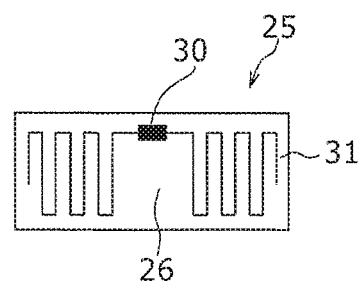
FIG. 3A is a diagram illustrating a configuration of an RF tag included in the luminaire and is a schematic view showing an external appearance of the RF tag.
Figure 3B:
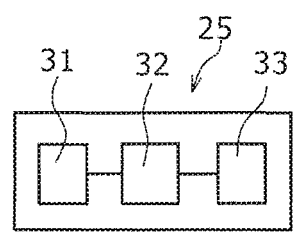
FIG. 3B is a diagram illustrating a configuration of the RF tag included in the luminaire and is a block diagram showing the configuration of the RF tag.

Acquisition of the IDs of the RF tags 25 and the included information by the RF reader 8 is executed, for example, as shown below. A configuration of each RF tag 25 will be described first. FIG. 3A is a schematic diagram showing an external appearance of each RF tag 25, and FIG. 3B is a block diagram showing the configuration of the RF tag 25. As shown in FIG. 3A, the RF tag 25 includes a base member 26 in a thin plate shape, a body portion 30 and an antenna 31. The base member 26 is configured in a thin plate shape and formed with resin or the like. Further, the body portion 30 and the antenna 31 are fitted on the base member 26. Referring to FIGS. 3A and 3B, the body portion 30 includes a control circuit 32 and a memory 33. As shown in FIG. 3B, each of the antenna 31 and the memory 33 is electrically connected to the control circuit 32. The control circuit 32 is used, for example, to reproduce information stored in the memory 33.

Next, an operation of acquiring information from an RF tag 25 will be described. First, a command to acquire an ID and included information is transmitted on a radio wave from an antenna of the RF reader 8. This radio wave is received by the antenna 31 of the RF tag 25. The RF tag 25 takes out power of the control circuit 32 and the transmitted command from the received radio wave. The control circuit 32 of the RF tag 25 transmits an ID of the RF tag 25 and included information on a radio wave from the antenna 31. The RF reader 8 receives the ID and included information of the RF tag 25 by means of its antenna. A control circuit of the RF reader 8 takes out the ID and address of the RF tag 25 from the received radio wave. Since it is desired to acquire only information about the RF tag of one luminaire 21, it is preferable that output of the RF reader 8 is set low and that a radio wave is sent in a state where the RF reader 8 is brought close to the luminaire 21. While a trigger button (not shown in the figure) for radiating a radio wave of the RF reader 8 is pressed, the RF reader 8 repeats the operation of transmitting the command to acquire an ID and included information on a radio wave from the antenna of the RF reader 8 and receiving included information from an RF tag 25.

Reading of various items of information about the nine luminaires 21 by the RF reader 8 can be performed, for example, in order of A1, B1, C1, C2, B2, A2, A3, B3 and C3, hut order is not limited to this order. Further, the number of luminaires 21 may be any number that is two or more. As the RF tag, an RF tag having a power source for a control circuit may be adopted. When reading ends, read data is transmitted from the RF reader 8 to the operation terminal 7 in a direction indicated by an arrow γ in FIG. 1 by an operation to be described later. The RF reader 8 and the operation terminal 7 include wireless communication devices to mutually perform communication, for example, using Bluetooth (registered trademark) (one of short-range wireless communication techniques used for inter-device connection of about several meters).

Figure 4:
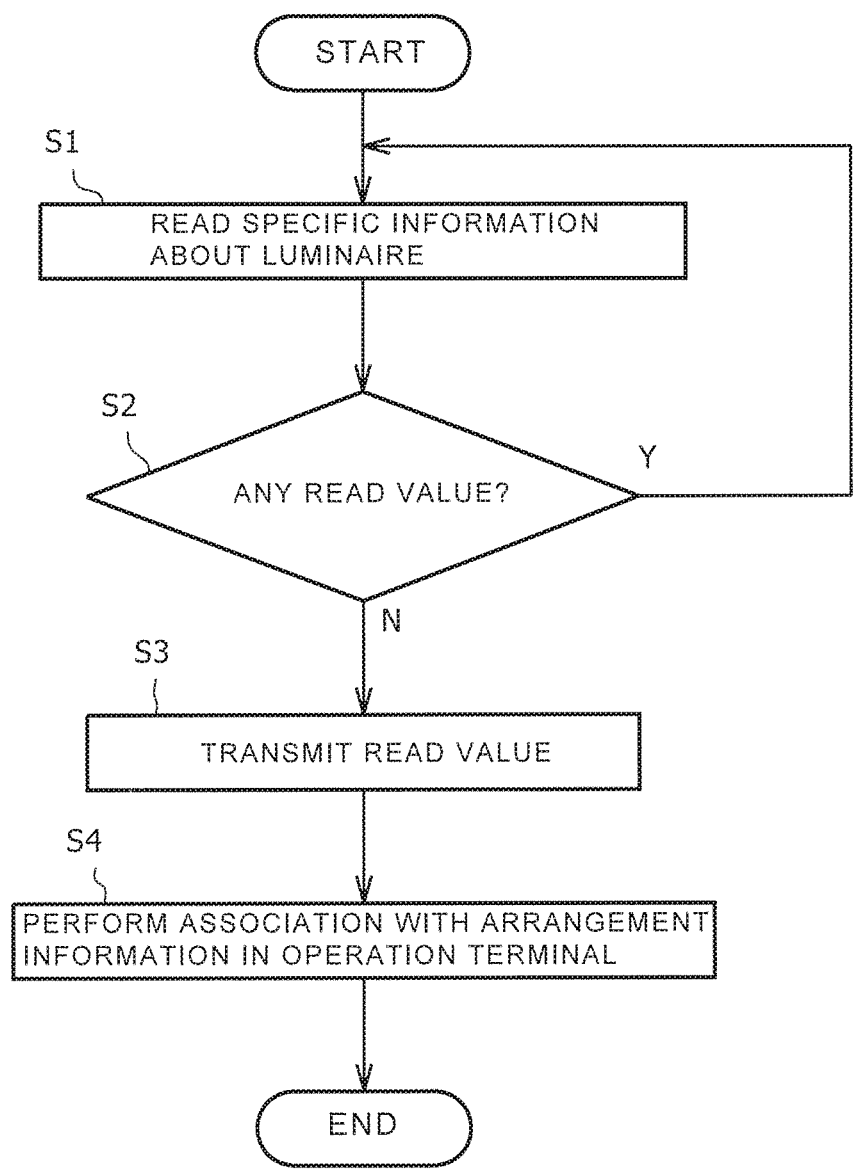
FIG. 4 is a flowchart showing an example of a work procedure that a worker performs at the time of registering apparatuses in the first embodiment.

FIG. 4 is a flowchart showing an example of a work procedure for a worker. First, the worker performs reading of specific information about each luminaire 21 using the RF reader 8 (step S1). The reading of the specific information about each luminaire 21 is executed until the reading of items of specific information about all the luminaires 21 is completed (step S2). When the reading of the items of specific information about all the luminaires 21 is completed, the items of specific information about all the luminaires 21 are transmitted from the RF reader 8 to the operation terminal 7 (step S3). After the transmission is completed, the items of specific information about the luminaires 21 are associated with a plurality of items of arrangement information (layout information) about the plurality of luminaires 21 stored in the operation terminal 7 in advance, using an operation portion of the operation terminal 7 (step S4). When the association is completed, the work ends.

Figure 5A:
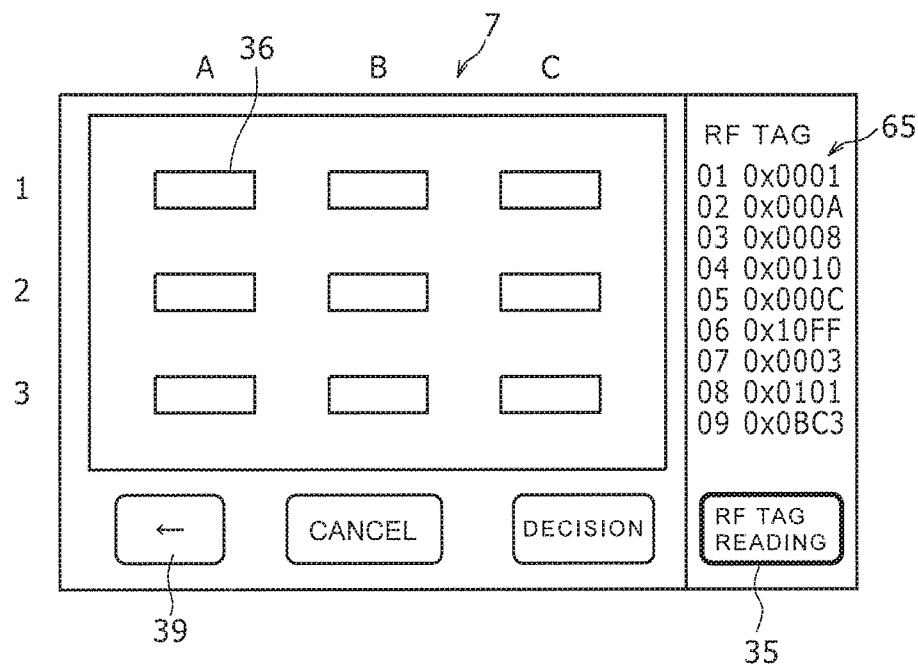
FIG. 5A is a diagram showing an operation screen of an operation terminal that appears at the time of registering the apparatuses in the first embodiment.

FIGS. 5A to 5D are diagrams showing an operation screen of the operation terminal 7. Next, description will be given on an operation of associating the items of specific information about the luminaires 21 with the items of arrangement information about the luminaires 21, using FIGS. 5A to 5D. Referring to FIG. 5A, an application having a layout drawing in which nine icons 36 of the nine luminaires 21 to be controlled are arranged is activated on the operation terminal 7 first. Items of information about arrangement positions of the nine icons 36 in the layout drawing are the items of arrangement information about the nine luminaires 21 corresponding thereto. The icons 36 of the nine luminaires 21 are the same. The layout drawing is created on the operation terminal 7 or configured by taking an arrangement drawing of the luminaires 21 into the operation terminal 7 from a working drawing or the like. The layout drawing corresponds to a layout of the nine luminaires 21 actually installed. When an "RF tag reading" button 35 on the screen of the operation terminal 7 is pressed, the IDs and addresses of the nine RF tags 25 read by the RF reader 8 are transmitted to the operation terminal 7. When receiving the data, the operation terminal 7 displays the read IDs of the RF tags 25 on an ID display portion 65 on the screen of the operation terminal 7. As shown in FIG. 5A, the read IDs of the RF tags 25 are displayed from the top to bottom of the ID display portion 65 being associated with positions in order of having been read.

Figure 5B:
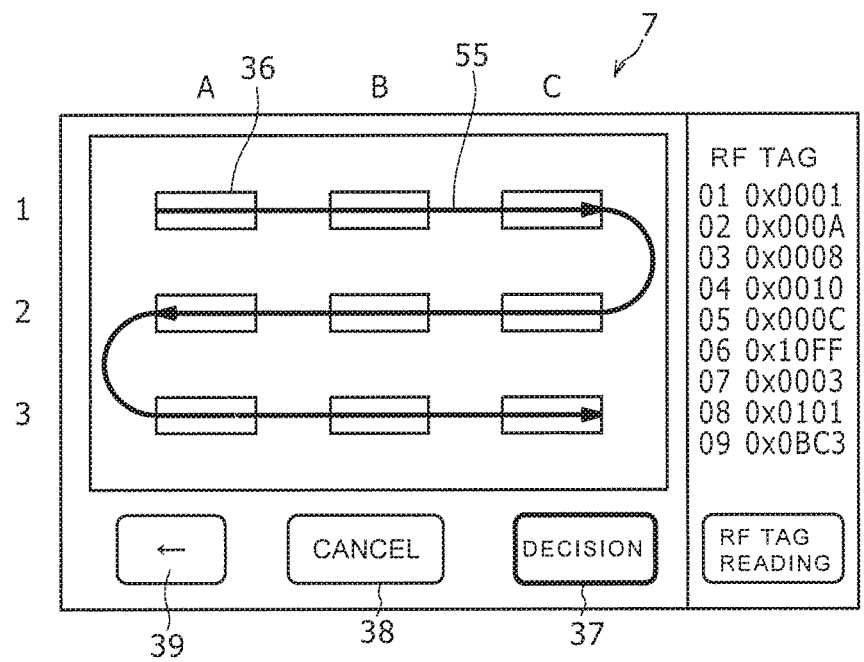
FIG. 5B is a diagram showing an operation screen of the operation terminal that appears at the time of registering the apparatuses in the first embodiment.

Next, as shown in FIG. 5B, the icons 36 of the luminaires 21 on the screen of the operation terminal 7 are selected in order of the items of specific information about the luminaires 21 having been read. The worker can easily perform this work because they have performed the reading work themselves and know the order of the luminaires 21 for which the reading has been performed. The work of consecutively associating the plurality of items of specific information read by the RF reader 8 with the plurality of items of arrangement information about the plurality of luminaires 21 can be executed, for example, by tracing a walk route on the screen. Otherwise, the work of consecutively associating the plurality of items of specific information read by the RF reader 8 with the plurality of items of arrangement information about the plurality of luminaires 21 can be executed by touching the icons 36 corresponding to the luminaires 21 in order of the luminaires 21 for which the reading work was performed. As shown in FIG. 5B, after this, a work order of the nine luminaires 21 for which the reading work has been performed is displayed on the screen, using the icons 36 corresponding to the luminaires 21. In this example, it is shown by a route 55 indicated by arrows that the worker has read the items of specific information about the luminaires 21 in order of A1, B1, C1, C2, B2, A2, A3, B3 and C3.

If the worker selects the icons 36 in the wrong order, they can return the operation screen (a display screen) to the state shown in FIG. 5A by touching a "cancel" button 38. On the other hand, if selection order of the icons 36 is correct, the IDs of the nine RF tags 25 are simultaneously associated with the icons 36 of the nine luminaires 21 arranged in the same layout as the nine luminaires 21 on the screen as shown in FIG. 5C by touching a "decision" button 37.

The icons 36 corresponding to the nine luminaires 21 are ordered in order of the corresponding luminaires 21 having been read, and the IDs of the RF tags 25 of the luminaires 21 are ordered in order of having been read. Therefore, it becomes possible to associate the icons 36 with the IDs of the RF tags 25, and as a result, it becomes possible to associate each icon 36 with a luminaire 21 corresponding to the icon 36.

Figure 5C:
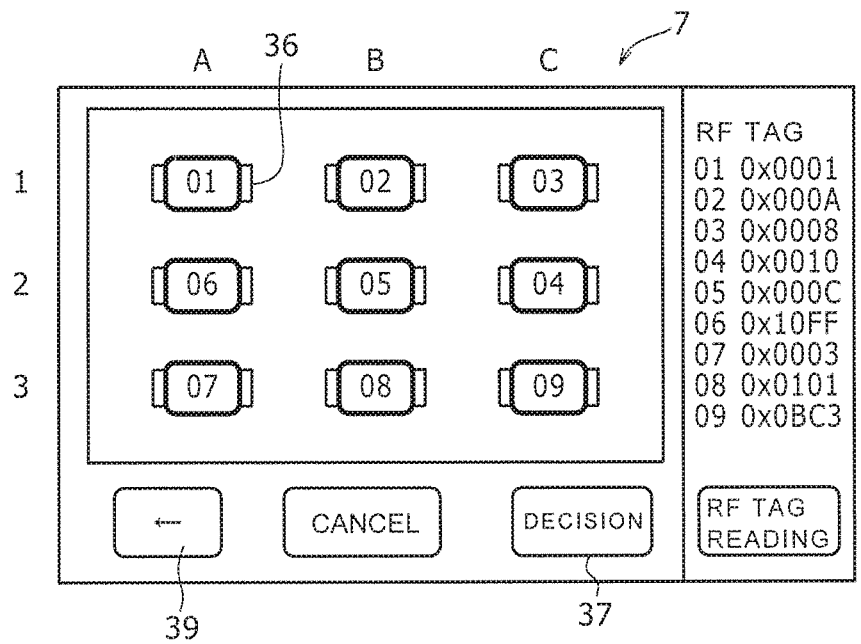
FIG. 5C is a diagram showing an operation screen of the operation terminal that appears at the time of registering the apparatuses in the first embodiment.
Figure 5D:
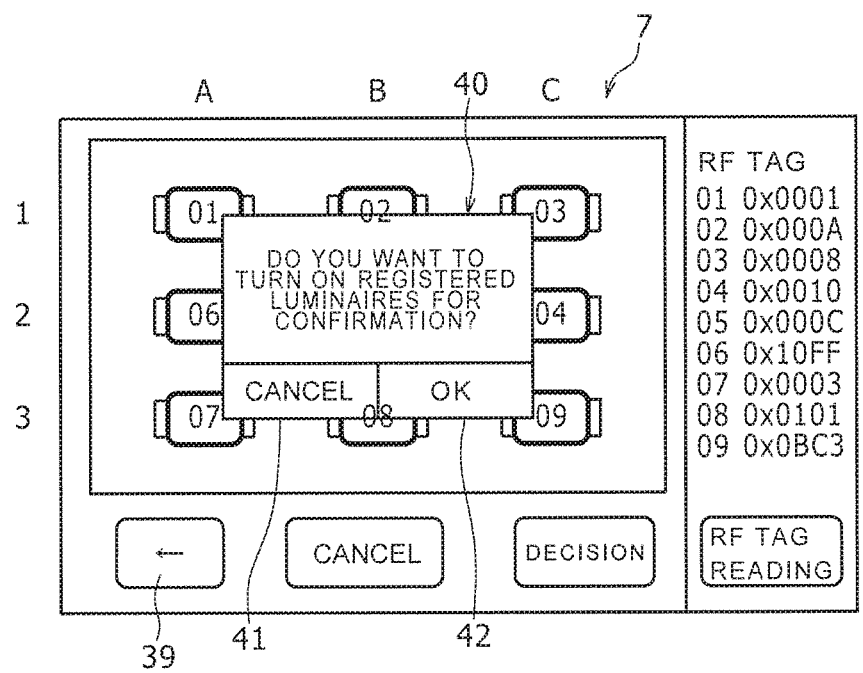
FIG. 5D is a diagram showing an operation screen of the operation terminal that appears at the time of registering the apparatuses in the first embodiment.

In the example shown in FIG. 5C, this association can be visually recognized by displaying order of reading the IDs of the RF tag 25, on the icons 36. By touching the "decision" button 37 in the state shown in FIG. 5C, a display for confirming whether or not to turn on the luminaires 21 is displayed on the operation screen as shown in FIG. 5D. This confirmation display is performed, for example, by displaying words 40 of "Do you want to turn on the registered luminaires for confirmation?" and a "cancel" button 41 and an "OK" button 42 on the screen.

By selecting the "OK" button 42 in this state, the nine luminaires 21 are turned on in order of the items of specific information having been read. At this time, a luminaire 21 for which specific information reading will be performed later is turned on after a luminaire 21 for which specific information reading was performed earlier is turned off. By turning on the luminaires 21 in order as described above, it is possible to confirm whether setting has b correctly performed at an installation stage. On the other hand, by selecting the "cancel" button 41 in the display state shown in FIG. 5D, the operation of confirmation by turning on the luminaires 21 can be omitted. After this series of operations, a "←" button 39 is pressed to transition to another screen. A configuration is also possible in which the operation screen shown in FIG. 5D does not exist, and the confirmation operation cannot be performed.

Figure 6A:
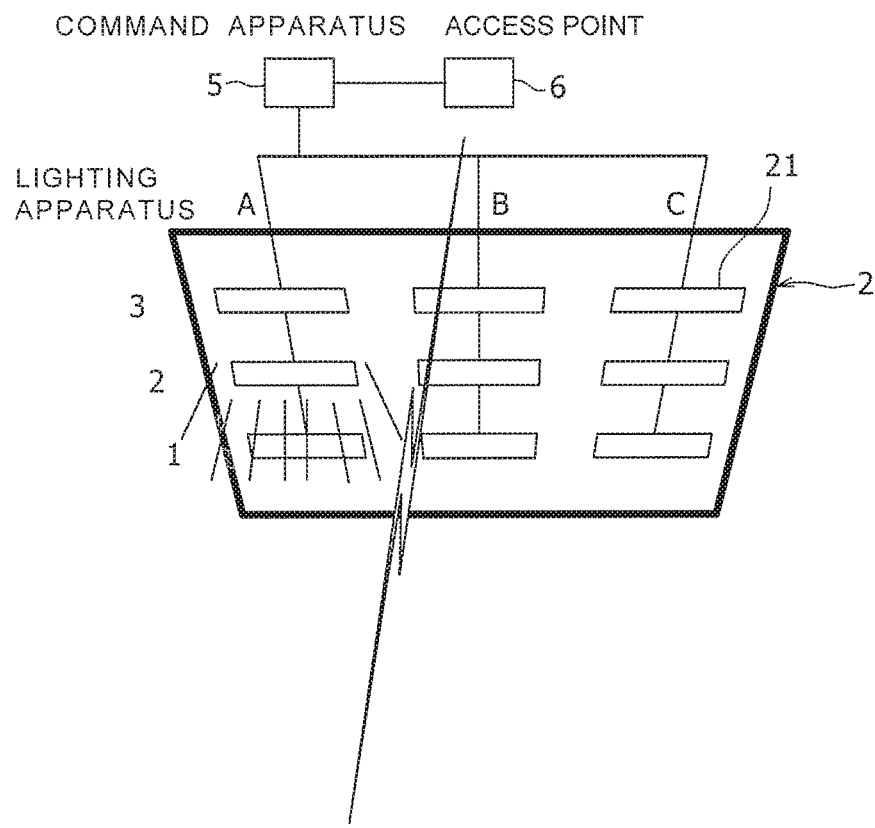
FIG. 6A is a diagram showing a state where the apparatuses are controlled after setting on the operation terminal is completed.

FIG. 6A is a diagram showing a state where the lighting apparatus 2 is controlled after the setting on the operation terminal 7 is completed. After the setting on the operation terminal 7 is completed, the icons 36 of the luminaires 21 on the layout drawing on the screen of the operation terminal 7 are tied to the actual luminaires 21. Therefore, it is possible to output a signal to a desired luminaire 21 via the access point 6 and the command apparatus 5, using the operation terminal 7, and it is possible to individually control a desired luminaire 21. In the example shown in FIG. 6A, the operation terminal 7 outputs a turn-on signal to the luminaire 21 of A2 via the access point 6 and the command apparatus 5, and the luminaire 21 of A2 is turned on. For example, turn-on control of the luminaire 21 of A2 can be realized simply by touching an icon 36 corresponding the luminaire 21 of A2. While the luminaire 21 is on, a color of the corresponding icon 36 changes to a particular color.

Figure 6B:
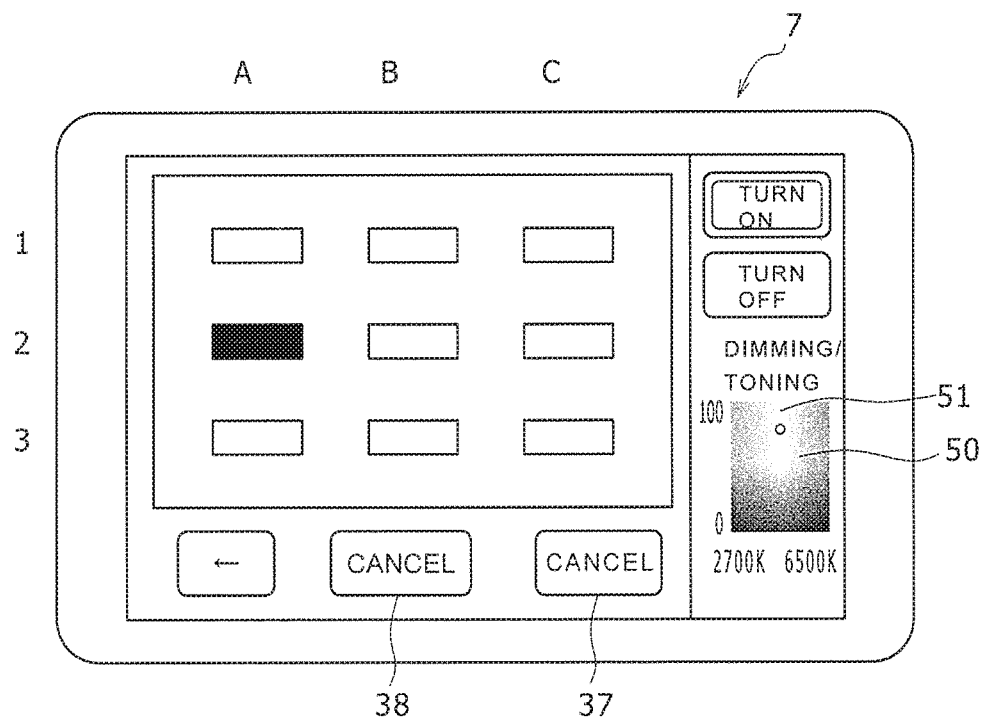
FIG. 6B is a diagram showing an operation screen that appears on the operation terminal in a state where one or more particular apparatuses are turn-on controlled and selected.

In this embodiment, dimming/toning of a desired luminaire 21 can be freely executed. Specifically, in a state where one or more particular luminaires 21 are turn-on controlled and selected, a color selection display portion 50 appears on the screen as shown in FIG. 6B. In the color selection display portion 50 of the present embodiment, a color is two-dimensionally displayed with a color temperature and an output range (a magnitude of output). By selecting one point 51 at two-dimensional coordinates specified by a color temperature and an output range in the color selection display portion 50 and selecting the "decision" button 37, colors of light radiated from the selected one or more particular luminaires 21 can be caused to correspond to a color specified by the one point 51. Further, if a wrong setting is made, one point can be selected in the color selection display portion 50 again by selecting the "cancel" button 38. That is, the operation terminal 7 has a selection portion for selecting, for each luminaire 21, a color temperature and output of light radiated from the luminaire 21. In this example, the selection portion includes the color selection display portion 50, the "decision" button 37 and the "cancel" button 38. In the example shown in FIG. 6B, the luminaire 21 of A2 is in a state where dimming/toning is possible. A configuration is also possible in which dimming/toning of light radiated from the luminaires cannot be executed.

FIGS. 7A to 8B are diagrams showing an operation screen of the RF reader 8. Next, an operation of modifying a reading task will be described using FIGS. 7A to 8B.

Description will be given for a case of, while consecutively reading IDs of the RF tags 25 of the plurality of luminaires 21 by the RF reader 8, reading an ID of an RF tag of a luminaire other than the desired luminaires 21 by mistake, with reference to FIGS. 7A and 7B. In this case, the ID concerned in an RF tag ID list displayed on the screen of the RF reader 8 is selected and eliminated. Specifically, it may happen that, while reading specific information (an ID of an RF tag 25) about a desired luminaire 21, the RF reader 8 performs not only reading of the specific information about the desired luminaire 21 but also reading of specific information about another luminaire 21. After reading of items of specific information about all luminaires 21, IDs of RF tags are displayed in a column in order of having been read on the screen of the RF reader 8, and the number of times the ID of each RF tag has been read is also displayed.

Figure 7A:
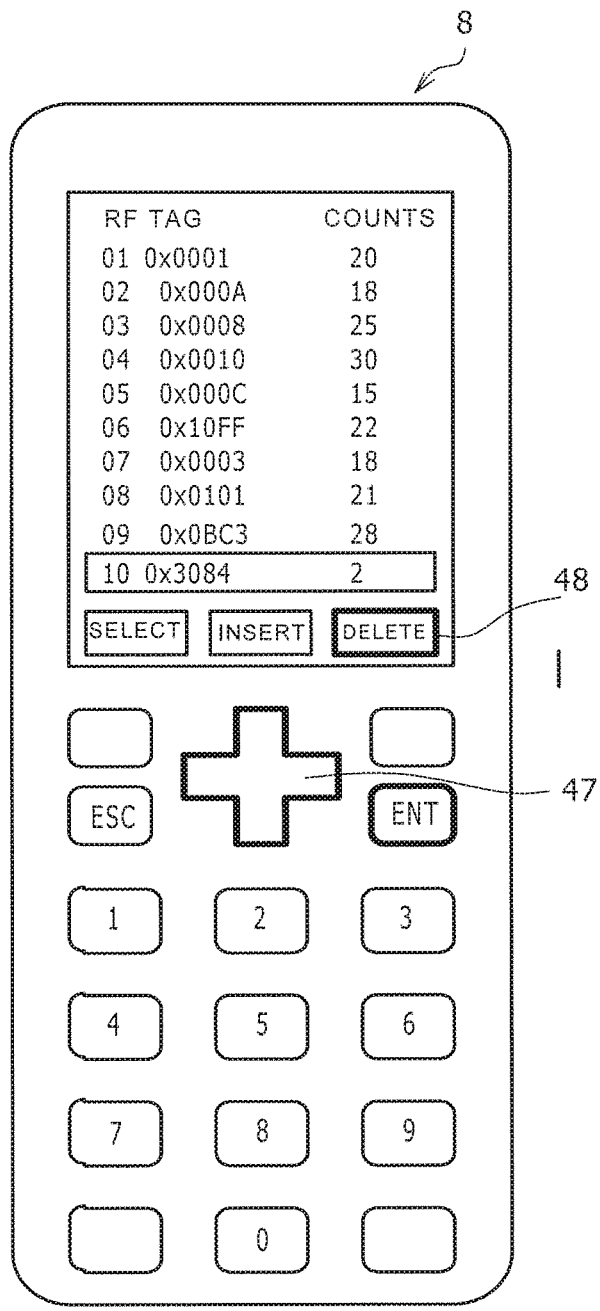
FIG. 7A is a diagram showing an operation screen of a reading apparatus and is a diagram for illustrating modification of reading work.
Figure 7B:
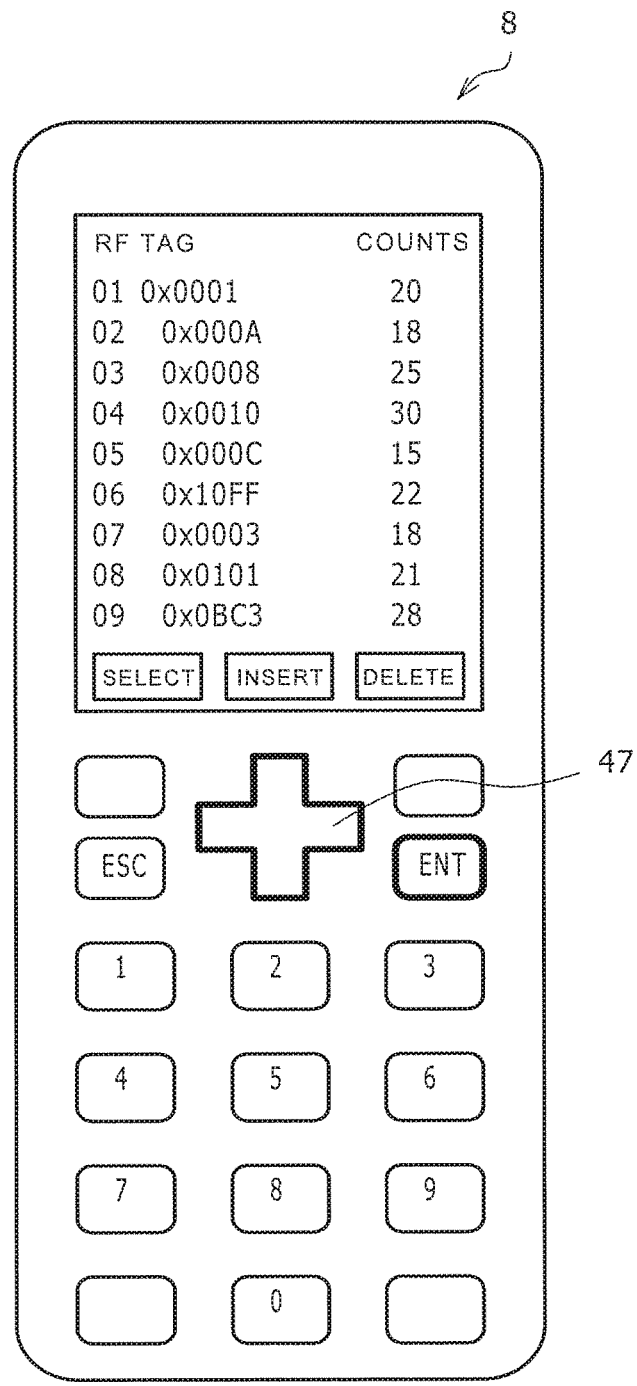
FIG. 7B is a diagram showing the operation screen of the reading apparatus and is a diagram for illustrating the modification of reading work.

For example, in an example shown in FIGS. 7A and 7B, it is shown that an ID of $0_X0001$ is read first, and the ID is read twenty times while IDs of all RF tags are read. Here, for an ID that is read a small number of times during the operation of reading items of specific information about all the luminaires 21, there is a strong possibility that an RF tag of the ID will be disposed away from the RF reader 8, and there is a strong possibility that the ID is an ID of a luminaire other than the desired luminaires 21. In the example shown in FIGS. 7A and 7B, an ID of $0_X3084$ read at the tenth time is read only twice during the operation of reading the items of specific information about all the luminaires 21, and therefore there is a strong possibility that the ID is an ID of an RF tag of a luminaire other than the desired luminaires 21. In this case, a frame is moved to surround the ID read the tenth time that is to be eliminated, by a frame up/down movement button 47 of the RF reader 8 as shown in FIG. 7A. Then, by operating a deletion button 48 in a state where the ID read the tenth time that is to be eliminated is surrounded by a frame, a state where the RF reader 8 has normally read nine IDs can be obtained, as shown in FIG. 7B.

Figure 8A:
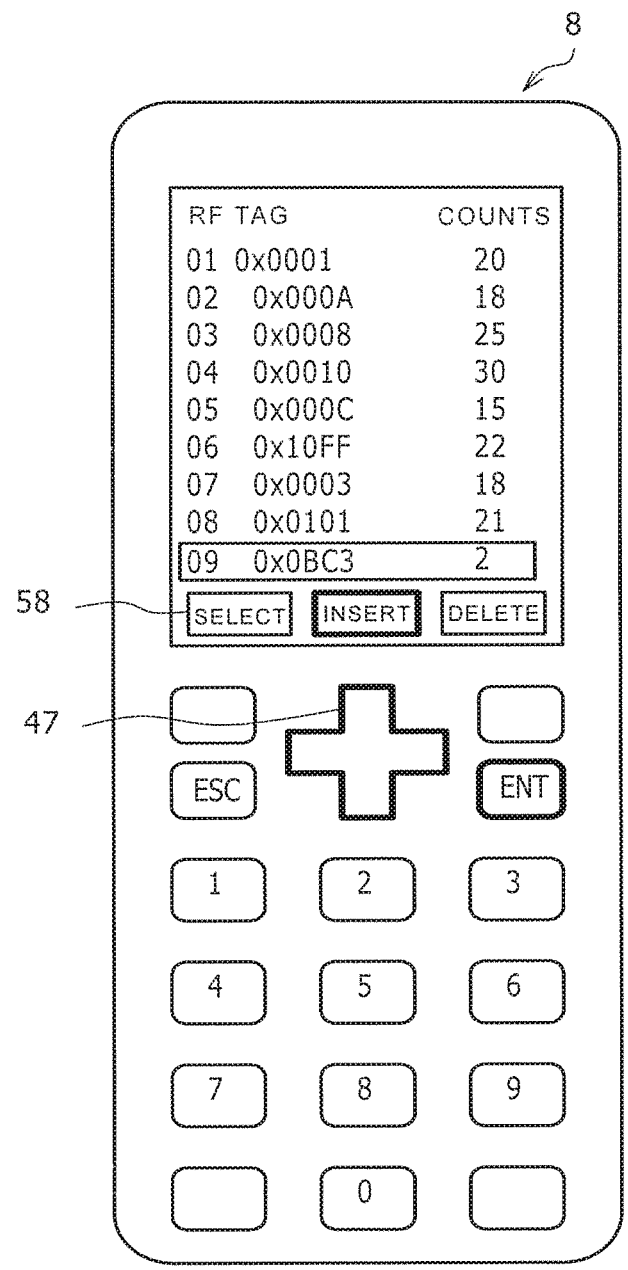
FIG. 8A is a diagram showing the operation screen of the reading apparatus and is a diagram for illustrating modification of reading work.
Figure 8B:
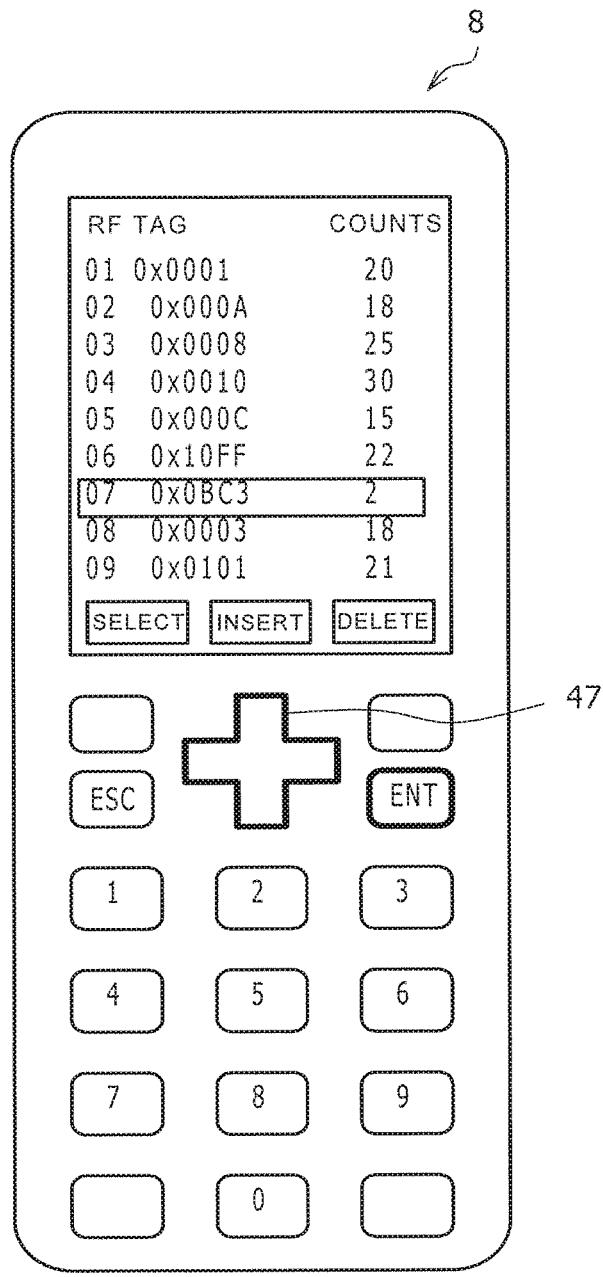
FIG. 8B is a diagram showing the operation screen of the reading apparatus and is a diagram for illustrating the modification of reading work.

Next, using FIGS. 8A and 8B, description will be given on an operation performed in a case where the number of IDs of RF tags consecutively read by the RF reader 8 does not reach an expected number. In this case, the worker reads the RF tag of each luminaire 21 again while confirming IDs of RF tags displayed on the screen of the RF reader 8 shown in FIGS. 8A and 8B and the number of times of each ID being read. By confirming that an ID of an RF tag that was not read last time has been taken in, the worker knows a position of the new RF tag in order of being read. The ID of the RF tag that was not read last time is displayed at the bottom of the screen of the RF reader 8 as shown in FIG. 8A. After causing the added ID to be surrounded by a frame by an operation of the frame up/down movement button 47, the added ID is selected by operating a "selection" button 58. Furthermore, the added ID is caused to move and inserted into a line corresponding to a position in order of having been read as shown in FIG. 8B by an operation of the frame up/down movement button 47. By this operation, a state where the RF reader 8 stores the nine IDs in order of having read the IDs can be obtained, and a state where the nine IDs are normally read can be obtained. If the desired number of IDs can be acquired, the IDs are transmitted to the operation terminal 7. Since the operations shown in FIGS. 7A to 8B can be performed in the present embodiment, it is not necessary to read all IDs again even if a wrong ID reading operation has been performed, and it is possible to realize operations that are easy to perform. A configuration is also possible in which the operations described with reference to FIGS. 7A to 8B can be executed not by the RF reader 8 but by the operation terminal 7. Further, a configuration is also possible in which the operations described with reference to FIGS. 7A to 8B can be executed neither by the RF reader 8 nor by the operation terminal.

As will be apparent from the above description, according to the first embodiment, the method for registration of luminaires 21 associates a plurality of luminaires 21 with a plurality of items of arrangement information about the plurality of luminaires 21 stored in the operation terminal 7 for operating the luminaires 21. Further, the method for registration of luminaires 21 includes a step of consecutively reading at least two or more of items of specific information using the RF reader 8, each of the items being an item of specific information of the luminaire 21 included in the plurality of luminaires 21, and a step of storing the plurality of items of arrangement information into the operation terminal 7. Further, the method for registration of luminaires 21 includes a step of consecutively associating the at least two or more items of specific information read by the RF reader 8 with at least two or more items of arrangement information among the plurality of items of arrangement information.

Therefore, it is possible to accurately associate two or more items of specific information with two or more items of arrangement information on the operation terminal 7. It is possible to simultaneously associate and tie the two or more items of specific information with and to the two or more items of arrangement information. Specifically, the following registration method of a reference example will be considered. In the registration method of the reference example, after reading a plurality of items of specific information into a reading apparatus, a luminaire corresponding to each item of specific information is actually turned on. Then, by moving an item of arrangement information corresponding to each item of specific information to an arrangement position corresponding to a luminaire that has been actually turned on, in a layout drawing stored in an operation terminal, association is performed. Unlike the registration method of this reference example, it is not necessary to associate items of specific information with items of arrangement information one by one in the method for registration of luminaires 21. Therefore, it is possible to improve registration work efficiency and shorten installation time. Further, unlike the above registration method of the reference example, it is possible to perform association between specific information and arrangement information without turning on the luminaires 21. Furthermore, the luminaires 21 may be arranged at predetermined positions after reading the specific information about the luminaires 21. In this case, since it becomes possible to perform association between specific information and arrangement information before arranging the luminaires 21 at predetermined positions on the ceiling, it is possible to easily perform the association. Further, the larger the number of items of specific information to be registered is, the more the work efficiency can be increased.

Further, the method for registration of luminaires 21 may include a step of, when the number of a plurality of items of specific information read by the RF reader 8 is larger than the number of a plurality of luminaires 21 registered with the operation terminal 7, deleting one or more items of specific information among the read plurality of items of specific information. To make a description just in case, the step of deleting one or more items of specific information may be included in methods of second and third embodiments to be described later.

According to the above configuration, when the number of a plurality of items of specific information read by the RF reader 8 is larger than the number of a plurality of luminaires 21 registered with the operation terminal 7, it is not necessary to read items of specific information about all the luminaires 21 again, and it is only necessary to delete specific information unrelated to the lighting system. Therefore, it is possible to improve the registration work efficiency.

Further, the method for registration of luminaires 21 may include a step of, when the number of a plurality of items of specific information read by the RF reader 8 is smaller than the number of a plurality of luminaires 21 registered with the operation terminal 7, inserting a newly read item of specific information about a luminaire 21 into the operation terminal 7. To make a description just in case, the step of inserting into the operation terminal a newly read item of specific information about a luminaire may be included in the methods of the second and third embodiments to be described later.

According to the above configuration, when the number of a plurality of items of specific information read by the RF reader 8 is smaller than the number of a plurality of luminaires 21 registered with the operation terminal 7, it is not necessary to read items of specific information about all the luminaires 21 again, and it is possible to additionally read an item of specific information that could not be read. Therefore, it is possible to improve the registration operation efficiency.

Further, reading of specific information may be performed using an RF tag 25.

According to the above configuration, it is possible to increase a data capacity, and it is possible to accommodate apparatus information other than specific information. Further, unlike an identifier such as a bar code from which information cannot be read when a part thereof is hidden, it is possible to perform authentication work simply by holding up the RF reader 8 even if all part of the RF tag 25 is hidden.

Further, the lighting system 1 of the present disclosure may be provided with a plurality of luminaires 21 and the operation terminal 7 with which items of specific information about the luminaires 21 are registered using the method for registration of luminaires 21 of the present disclosure.

According to the above configuration, it is possible to construct the lighting system 1 in a short time without labor. Further, the larger the number of items of specific information to be registered is, the more the present registration method can increase the work efficiency. Therefore, in the lighting system 1, the larger the number of items of specific information to be registered is, the more time and costs required for registration operations can be reduced.

Further, the lighting system 1 of the present disclosure may be provided with a plurality of luminaires 21 and the operation terminal 7 with which the items of specific information about the luminaires 21 are registered using the apparatus registration method disclosed in the first embodiment. In the lighting system 1, the plurality of luminaires 21 may be turned on at least once in order of their items of specific information having been read.

According to the above configuration, the plurality of luminaires 21 are turned on in order of their specific information having been read. Therefore, it is possible to confirm whether or not setting has been correctly performed at an installation stage.

Association between specific information and arrangement information may not be used for association of all of a plurality of items of specific information as was done in the first embodiment, but may be applied only to association between some of a plurality of items of specific information and items of arrangement information corresponding thereto. That is, it is only necessary to use the association between specific information and arrangement information of the present disclosure for association of at least two or more items of specific information read by a reading apparatus.

Second Embodiment

Figure 9:
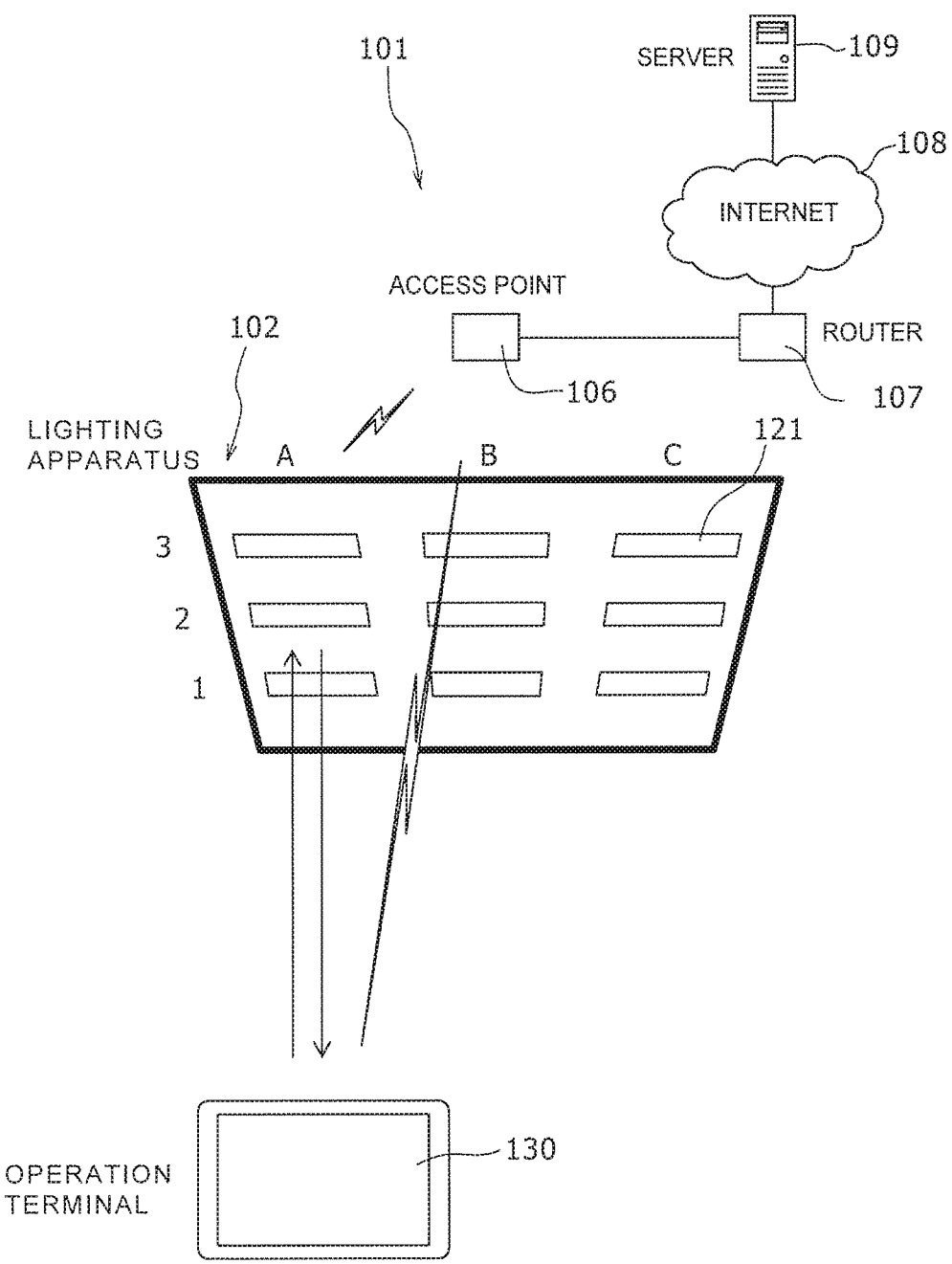
FIG. 9 is a diagram illustrating an outline of a lighting system capable of using an apparatus registration method according to a second embodiment of the present disclosure.

FIG. 9 is a diagram illustrating an outline of a lighting system 101 capable of using a method for registration of luminaires 121 according to a second embodiment of the present disclosure. The lighting system 101 is an example of an apparatus system. In the second embodiment, the same components as the first embodiment will be given the same reference numerals as the first embodiment, and description thereof will be omitted. Further, in the second embodiment, description of the same operation and effects, and modification, as the first embodiment will be omitted.

As shown in FIG. 9, in the second embodiment, an access point 106 is connected to a router 107, and the router 107 is connected to the Internet 108 and accesses a server 109 on the Internet 108. Further, each of nine luminaires 121 included in a lighting apparatus 102 includes an identifier, for example, a bar code or a QR code (registered trademark) instead of an RF tag. Further, an operation terminal 130 includes photographing means such as a camera. Using the photographing means to photograph the bar code or QR code (registered trademark) attached to a surface of a body portion of each of the luminaires 121, the operation terminal 130 acquires specific information (identification information (ID)) about the luminaire 121. In the second embodiment, the operation terminal 130 also serves as a reading apparatus. In other words, the operation terminal 130 includes a reading apparatus. Further, while the operation terminal 130 acquires the specific information from the identifier, it also acquires other information besides the specific information about each luminaire 121 from the server 109 via the access point 106, the router 107 and the Internet 108. Each of the specific information and the other information is included in apparatus information. Further, a part of the other information described above includes, for example, a MAC (Media Access Control) address of each luminaire 121 and information about a color temperature/output range that are tied to the specific information. The MAC address of each luminaire 121 and the color temperature/output range tied to the specific information are stored in the server 109 on the Internet 108 in advance. The MAC address is an example of specific address information. Any specific address information other than the MAC address may be stored in the server 109 on the Internet 108 in advance.

In general, data size of a bar code or QR code (registered trademark) is smaller than data size of an RF tag. Therefore, in the case of reading various items of information such as identification information about each luminaire 121 from a bar code or a QR code (registered trademark), readable information is less in comparison with the case of using an RF tag. Therefore, it is preferable that some information can be acquired from the server 109 via the Internet 108 in the case of using a bar code or a QR code (registered trademark) as in the second embodiment.

The items of information about the luminaires 121 and items of arrangement information (layout information) about the luminaires 121 stored in the operation terminal 130 are associated, for example, as shown below. First, before attaching the luminaires 121 to a ceiling, nine identifiers of the nine luminaires 121 are consecutively read in order by the operation terminal 130. After that, similarly to the first embodiment, nine items of specific information about the nine identifiers that have been read are consecutively associated with nine icons in a layout drawing in which arrangement of the nine luminaires 121 is shown, which is created in the operation terminal 130 in advance. After that, the nine luminaires 121 are installed on the ceiling according to the layout drawing in the operation terminal 130 and powered on. Further, the operation terminal 130 is connected to the server 109 on the Internet 108 to acquire the MAC addresses and color temperatures/output ranges tied to the items of specific information about the luminaires 121. Description has been given for the case where apparatus information associated with arrangement information and including specific information includes a MAC address and information about a color temperature/output range. The apparatus information associated with the arrangement information and including the specific information, however, may include information related to at least one of specific address information such as a MAC address, a product number, a product name, a model number, a dimming curve, a color temperature/output range and a color tone range. Further, the operation terminal may acquire the information related to at least one of the specific address information, the product number, the product name, the model number, the dimming curve, the color temperature/ output range and the color tone range, from the server on the Internet. Further, the configuration in which an operation terminal acquires the information related to at least one from a server on the Internet may be adopted in the first embodiment or in a third embodiment described next.

Figure 10A:
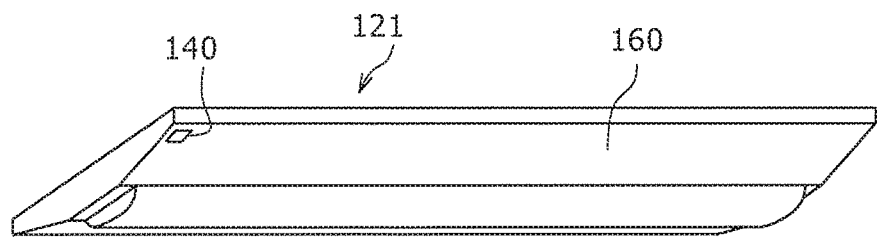
FIG. 10A is a diagram illustrating a configuration of a luminaire corresponding to FIG. 2A in the second embodiment.
Figure 10B:
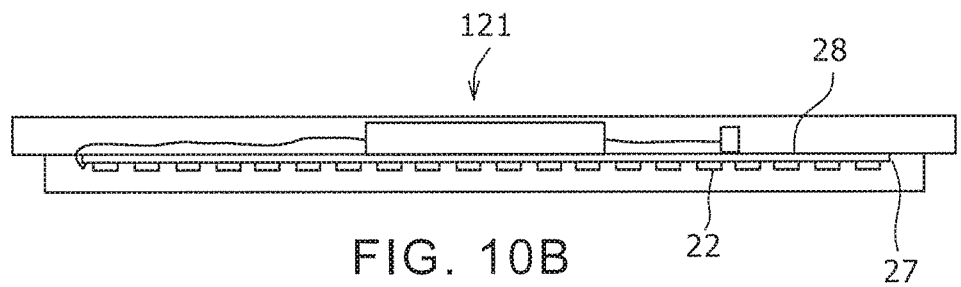
FIG. 10B is a diagram illustrating the configuration of the luminaire corresponding to FIG. 2B in the second embodiment.
Figure 10C:
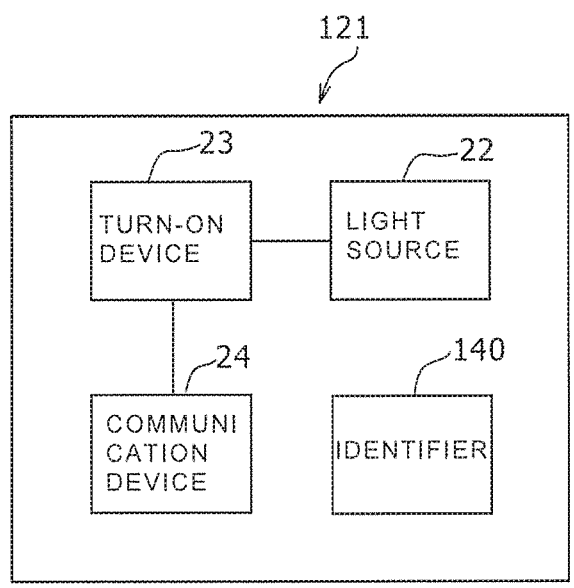
FIG. 10C is a diagram illustrating the configuration of the luminaire corresponding to FIG. 2C in the second embodiment.

FIGS. 10A, 10B and 10C are diagrams illustrating a configuration of each luminaire 121 corresponding to FIGS. 2A, 2B and 2C, in the second embodiment. As shown in FIG. 10A, an identifier 140 is attached to a front side of a surface cover 161 of the luminaire 121. Further, as shown in FIG. 10C, the luminaire 121 has the light sources 22, the turn-on device 23, the communication device 24 and the identifier 140, and the light sources 22 and the communication device 24 are connected to the turn-on device 23. It is preferable that the communication device 24 is configured with a wireless communication device such as a Wi-Fi device.

Figure 11A:
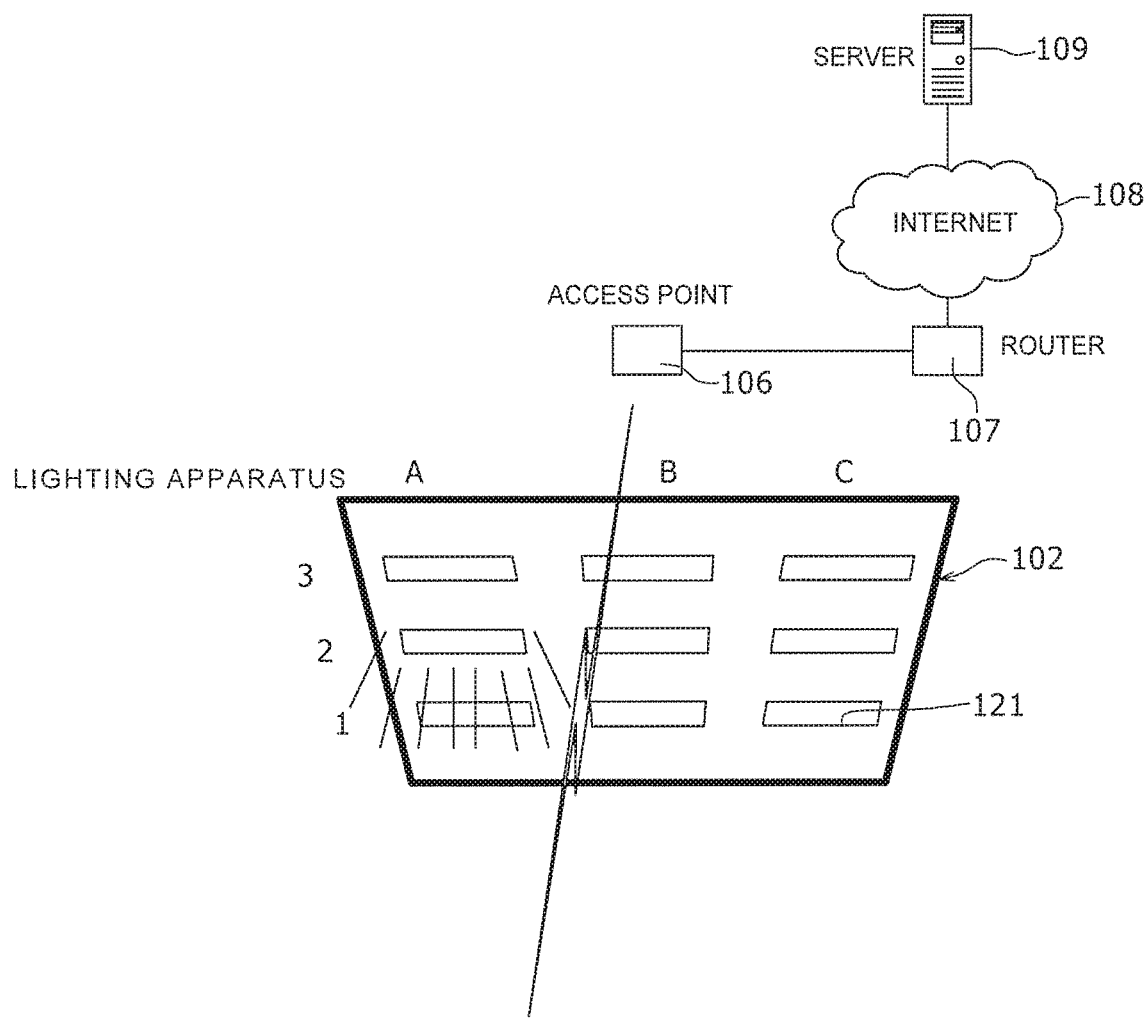
FIG. 11A is a diagram illustrating a transmission route of a control command to control a lighting state in the second embodiment.
Figure 11B:
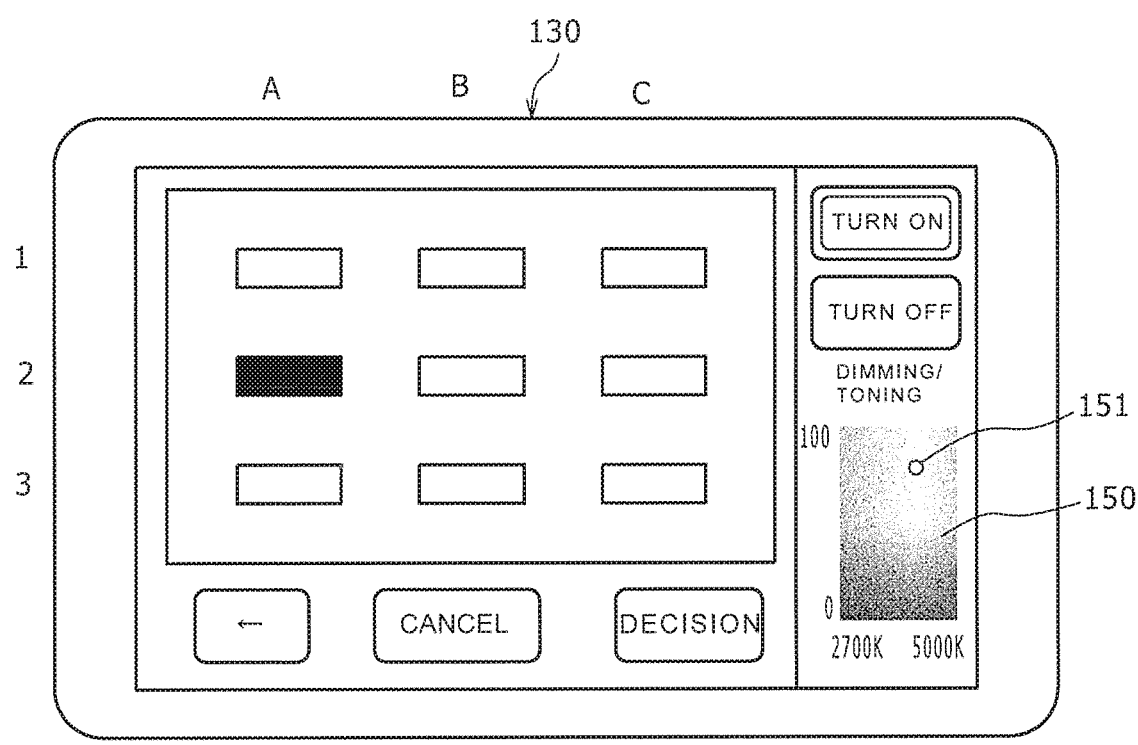
FIG. 11B is a diagram showing a lighting control screen on an operation terminal in the second embodiment.

Next, brief description will be given on control of the lighting apparatus 102 and a method for reflecting information about a color temperature/output range using FIGS. 11A and 11B. FIG. 11A is a diagram illustrating a transmission route of a control command to control a lighting state. As shown in FIG. 11A, in the second embodiment, the command apparatus existing in the first embodiment does not exist, and a control command to control a lighting state is transmitted from the operation terminal 130 to each luminaire 121 via the access point 106. Further, in the second embodiment, the operation terminal 130 acquires information about a color temperature/output range for each luminaire 121 from the server 109. Therefore, as shown in FIG. 11B, that is, in a figure showing a lighting control screen on the operation terminal 130, the information can be reflected on a display portion 150 for setting dimming/toning on the lighting control screen. For example, if information stored in the server 109 shows that the color temperature range and the output range are 2700 to 5000 k and 10 to 100%, respectively, the information can be reflected by showing one point 151 on a two-dimensional plane constituting the display portion 150. Thus, the operation terminal 130 has a selection portion that selects, for each luminaire 121, a color temperature and an output for light radiated from the luminaire 121. In the example shown in FIG. 11B, information about a color temperature/output range of the luminaire 121 of A2 is displayed. By acquiring not only MAC addresses of the luminaires 121 but also parameters required to control the luminaires 121, more advanced lighting control can be executed. According to the second embodiment, reading of specific information is performed with the identifier 140. Therefore, tying specific information to the luminaires 121 can be realized easily and at a low cost.

Third Embodiment

Control of a lighting apparatus may be executed for each individual luminaire, but the same control may be executed for a plurality of luminaires belonging to the same group. In a third embodiment, description will be given on association between specific information and arrangement information (layout information) in the case of performing group control of a lighting apparatus. In the third embodiment, description of the same operation and effects, and modification as the first embodiment and description of the same operation and effects, and modification as the second embodiment will be omitted.

In the above association in the group control, operations similar to the operations of the first embodiment are performed until an ID of an RF tag is transmitted to an operation terminal. Consecutive reading of items of specific information by an RF reader is, however, performed only for luminaires belonging to the same group, and the specific information reading operation is terminated once when the consecutive reading of the items of specific information about the luminaires belonging to the same group is completed.

Figure 12A:
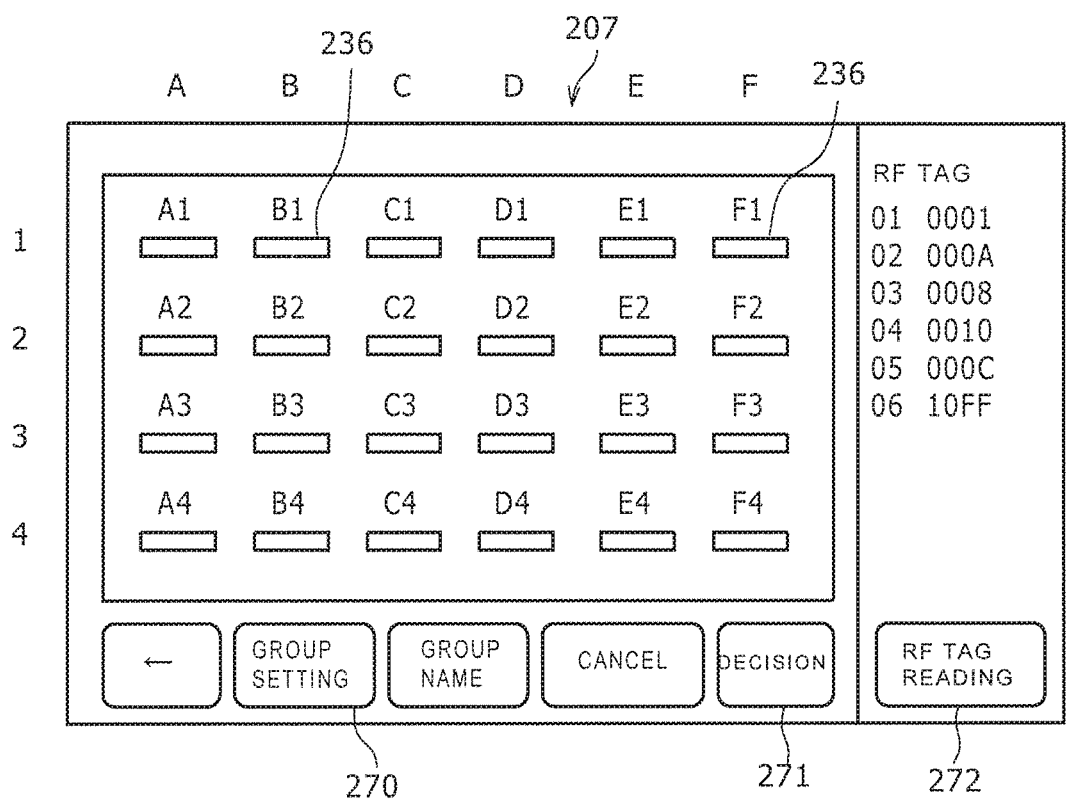
FIG. 12A is a diagram showing an operation screen of the operation terminal that appears at the time of registering the apparatuses in the second embodiment.

FIG. 12A is a diagram showing an operation screen of the operation terminal 207 at the time of performing association of information in the case of performing group control of a lighting apparatus, which is an operation screen including a layout drawing of luminaires. On this operation screen, six luminaires corresponding to six icons 236 included in a first line are arranged near a window and belong to the same group. In the case of performing association of information about this group, consecutive reading of items of specific information by the RF reader is consecutively executed for the six luminaires arranged near the window first. Then, when the reading of six items of specific information about the six luminaires by the RF reader is completed, the specific information reading work by the RF reader is terminated once. The operation screen shown in FIG. 12A shows a state after the six items of specific information described above are transmitted to the operation terminal 207.

For example, in this state, the worker touches the six icons of A1 to F1 after touching a "group setting" button 210, and then touches a "decision" button 271. By performing this operation, an operation screen shown in FIG. 12B appears, a color of the six icons 236 included in the first line changes, and the six icons 236 are surrounded by one frame. After that, by touching an "RF tag reading" button 272, the six items of specific information and the six icons 236 are associated and tied.

Figure 12B:
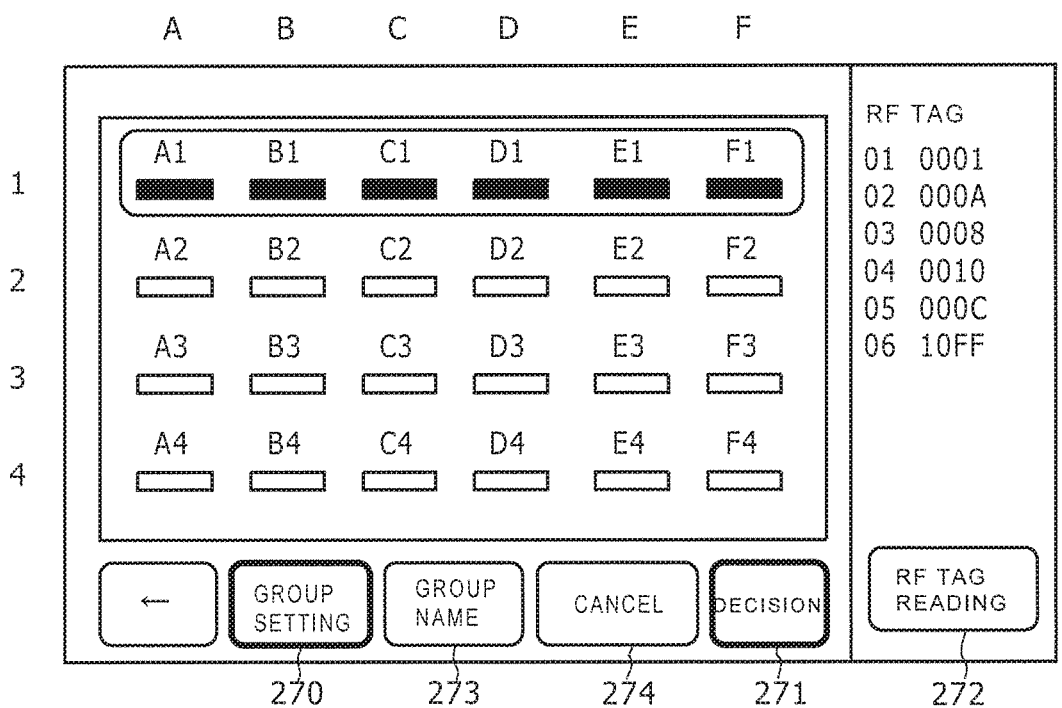
FIG. 12B is a diagram showing an operation screen of the operation terminal that appears at the time of registering the apparatuses in the second embodiment.
Figure 12C:
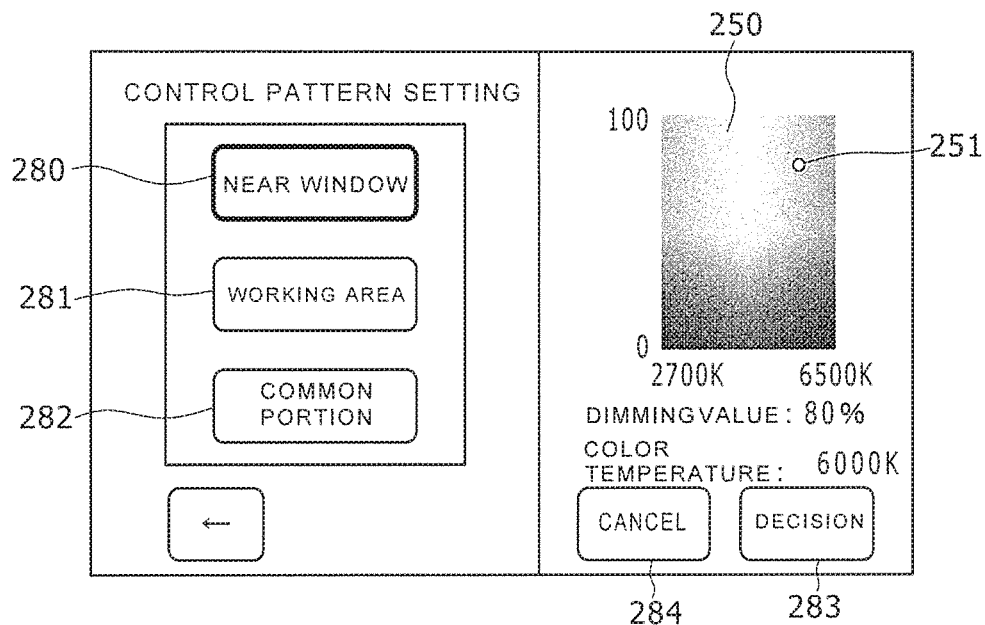
FIG. 12C is a diagram showing an operation screen of the operation terminal that appears at the time of registering the apparatuses in the second embodiment.

By touching a "cancel" button 274 on the operation screen shown in FIG. 12B, the state of the plurality of icons being surrounded by one frame can be cancelled, and the operation screen can be returned to the operation screen shown in FIG. 12A. Further, in the case of the group control, it is only necessary to tie, to a plurality of icons belonging to the same group, IDs of the same number of RF tags as the number of the icons, and it is not necessary to tie IDs of RF tags to icons of individual luminaires, respectively. Therefore, it is not necessary to identify an ID of an RF tag corresponding to each of the icons included in the first line.

Next, by touching a "group name" button 273 on the operation screen shown in FIG. 12B, a name registration screen not shown is displayed. By registering, for example, words of "near the window" on this screen, the six icons included in the first line are set as "near the window". For example, in a similar way, a group to which fifteen icons of A2 to E2, A3 to E3, and A4 to E4 belong is set as "working area", and a group to which three icons of F2 to F4 belong is set as "common portion". "Near the window", "working area" and "common portion" indicate attributes of the groups, respectively.

When the setting is completed, the operation screen changes to a screen for setting a lighting state of luminaires belonging to each group that is shown in FIG. 12G. At first, on the operation screen, by touching a "near the window" button 280 and then touching one point 251 on a display portion 250 for setting dimming/toning on the lighting control screen, light radiated by the six luminaires belonging to the "near the window" group can be set to light indicated by the one point 251. After that, by touching a "decision" button 283, the setting is registered. In the case of having made a wrong setting, one point can be selected in the display portion 250 again by selecting a "cancel" button 284.

Similarly, light to be radiated by the fifteen luminaires belonging to the "working area" group is set with a "working area" button 281, and light to be radiated by the three luminaires belonging to the "common portion" group is set with a "common portion" button 282. The operation terminal 207 has a selection portion for selecting a color temperature and output of the same light radiated from two or more luminaires belonging to the same group. In this example, the selection portion includes the display portion 250, the "decision" button 283 and the "cancel" button 284.

Figure 12D:
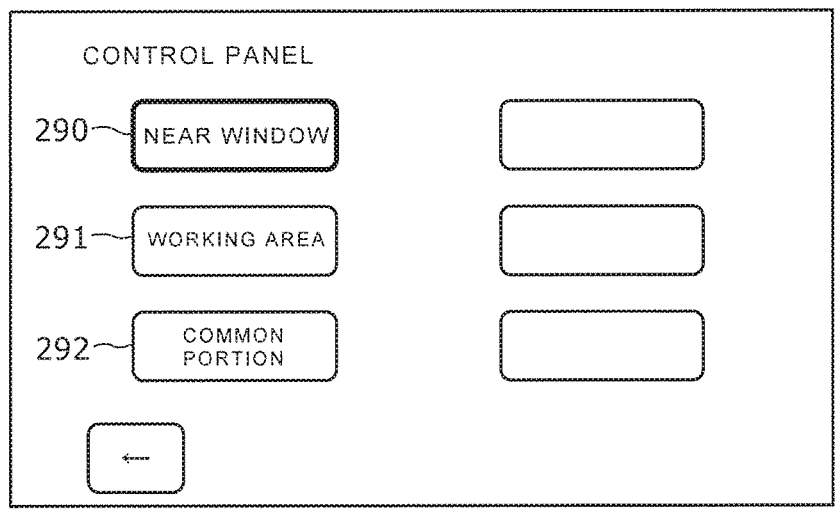
FIG. 12D is a diagram showing an operation screen for controlling the lighting state in the second embodiment.

As a result, it is possible to cause luminaires set as belonging to the same group to be turned on or off by the same turn-on or turn-off command. This operation can be realized by simultaneously transmitting a plurality of commands by multicast. FIG. 12D is a diagram showing an operation screen for controlling a lighting state. In the example shown in FIG. 12D, a "near the window" button 290 is selected, and the six luminaires belonging to the "near the window" group radiate the same light. Only one of the "near the window" button 290, a "working area" button 291 and a "common portion" button 292 can be selected. Two or more of the buttons 290 to 292 can be selected at the same time.

In the case of controlling luminaires by specifying a range of luminaires accompanying an attribute, an operation of turning the luminaires on or off can be executed based on the attribute, as in the third embodiment. Therefore, it is easy to recognize an operation being performed, and it is possible to prevent a mistake, such as turning on a wrong luminaire, from being made.

The operation screens shown in FIGS. 12A to 12D are mere examples, and the number of icons may be a number other than twenty-four. Further, the words "near to the window", "working area" and "common portion" need not be registered. Any words may be used. Further, the number of groups is not limited to three but may be two, four, or more. Further, a layout of the icons does not have to be in a matrix as in the first to third embodiments but may be a layout in a distorted shape corresponding to actual arrangement of a plurality of luminaires.

As described above, according to the third embodiment, the luminaire registration method associates a plurality of luminaires with a plurality of items of arrangement information about the plurality of luminaires stored in the operation terminal 207 for operating the luminaires. Further, the luminaire registration method includes a step of consecutively reading at least two or more of items of specific information using the RF reader, each of the items being an item of specific information of the luminaire included in the plurality of luminaires, and a step of storing the plurality of items of arrangement information into the operation terminal 207. Further, the luminaire registration method includes a step of associating the at least two or more items of specific information read by the RF reader with at least two or more items of arrangement information about the same group constituted by at least two or more luminaires included among the plurality of luminaires.

Therefore, it is possible to associate two or more items of specific information with two or more items of arrangement information on the operation terminal 207. Therefore, since it is possible to simultaneously associate and tie two or more items of specific information with and to two or more items of arrangement information, it is possible to improve the registration operation efficiency and shorten installation time. Further, the larger the number of items of specific information to be registered is, the more the operation efficiency can be increased. Further, it is possible to simultaneously execute the same turn-on control for a plurality of luminaires belonging to the same group.

Further, a step of associating at least two or more items of specific information with a group and an attribute of the group may be included.

According to the above configuration, it is possible to grasp an attribute of a group, and it becomes easy to accurately execute control of luminaires belonging to the group.

(Preferable Reading Apparatus)

Figure 13:
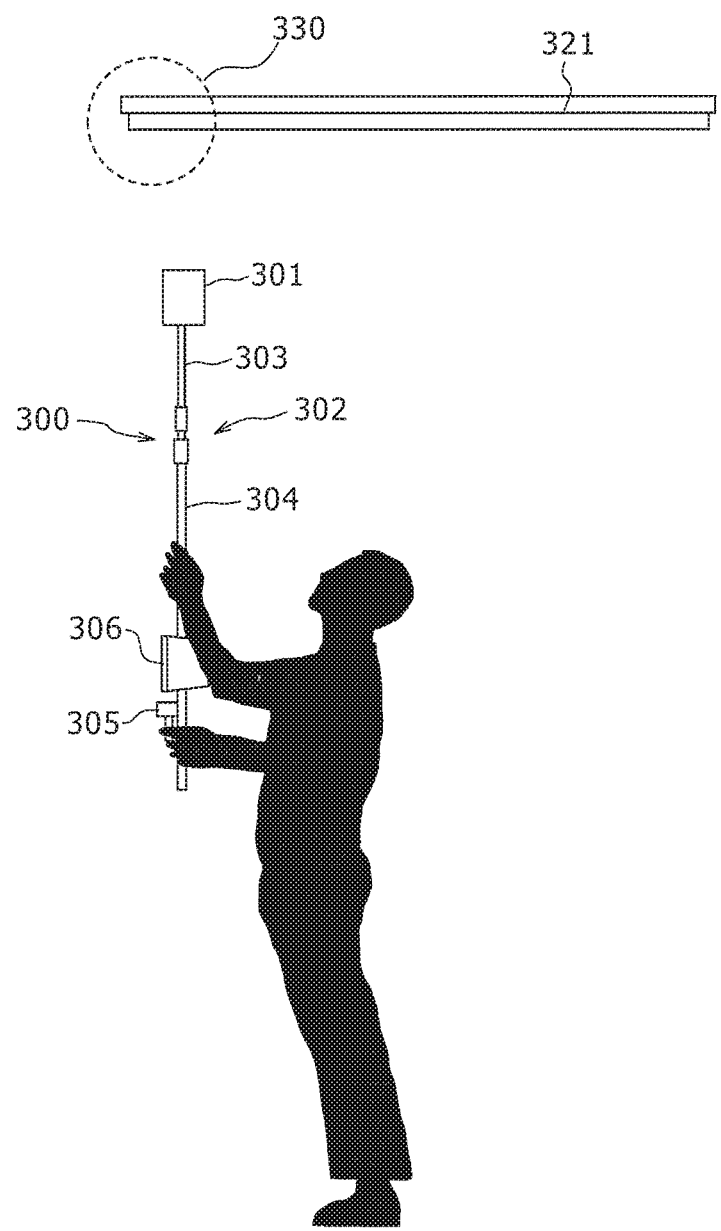
FIG. 13 is a diagram showing a configuration of a reading apparatus that can be preferably used at the time of reading an ID of an RF tag in the first and third embodiments.

FIG. 13 is a diagram showing a configuration of a reading apparatus 300 that can be preferably used at the time of reading an ID of an RF tag in the first and third embodiments. The reading apparatus 300 is such that a reading portion 301 including an antenna is attached to one tip portion of a rod-shaped supporting body 302. The supporting body 302 has a structure similar to a structure used for legs of a tripod of a camera. Specifically, the supporting body 302 has a configuration in which a plurality f hollow pipes 303 and 304 with different diameters are telescopic, and the plurality of pipes 303 and 304 are fixed to each other by a connection part. As a result, a length of the supporting body 302 can be arbitrarily changed.

On the other end portion side of the supporting body 302, a trigger portion 305 is provided, and a monitor portion 306 exists near the trigger portion 305. The reading portion 301, the trigger portion 305 and the monitor portion 306 are connected via wires wireless communication. When a trigger of the trigger portion 305 is pulled, a trigger signal is transmitted to the monitor portion 306, and the monitor portion 306 transmits a radio wave emission signal to the reading portion 301. By releasing the trigger, radio wave radiation is stopped.

The worker adjusts the length of the supporting body 302 so that a radio wave reaches an RF tag of a luminaire 321 attached to the ceiling, points the reading portion 301 toward an RF tag attaching portion 330, and pulls the trigger. Then, a radio wave is emitted from the reading portion 301, and the RF tag of the luminaire 321 receives the radio wave. The RF tag sends its own ID included in a memory and an address of a communication device in the luminaire 321 on a radio wave. The reading apparatus 300 receives the radio wave emitted from the RF tag, acquires the address of the communication device of the luminaire 321 and displays the ID of the RF tag and the address of the communication device on the monitor portion 306. When items of specific information about a plurality of luminaires 321 are read, the read number of items of specific information about the luminaires 321 are displayed on the monitor portion 306. After that, an RF tag reading signal is transmitted to the reading apparatus 300 from an operation terminal not shown, and the read items of specific information about the luminaires 321 are transmitted to the operation terminal.

Figure 14:
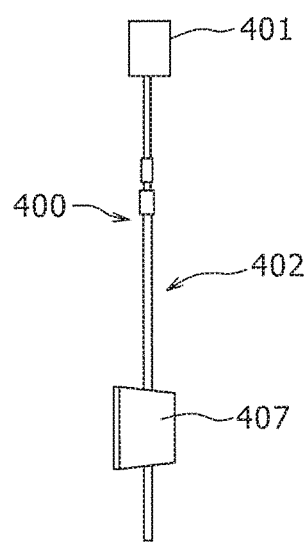
FIG. 14 is a diagram of a reading apparatus of a modification corresponding to FIG. 13.

The reading apparatus 300 includes the supporting body 302 with a stretchable structure and the trigger portion 305. Therefore, it is possible to easily read the items of specific, information about the luminaires 321 installed on a high ceiling, FIG. 14 is a diagram corresponding to FIG. 13 in a reading apparatus 400 of a modification. The reading apparatus 400 shown in FIG. 14 has an attaching portion, not shown, in addition to a supporting body 402 and a reading portion 401. An operation terminal 407 is attached to the attaching portion. The attaching portion can be realized by a structure of sandwiching and fixing the operation terminal 407, for example, like a selfie stick of a smartphone. The reading apparatus 400 does not have a trigger portion.

Sending of a radio wave, receiving of a radio wave from an RF tag, extraction of specific information about luminaires and display onto a screen can be executed by pressing a reading button on an application of the operation terminal 407.

The reading apparatus 400 is provided with the attaching portion for the supporting body 402 to fix the operation terminal 407. Therefore, it is possible to easily transmit specific information to the operation terminal 407 and increase reading efficiency.

(Preferable Program)

Furthermore, a program satisfying the following conditions may be used. Specifically, a program satisfying the following conditions (a), (b) and (c) may be used: (a) the program causes a computer to execute a process for associating a plurality of luminaires with a plurality of items of arrangement information about the plurality of luminaires stored in an operation terminal for operating the luminaires; (b) the program causes the computer to execute a process for simultaneously associating two or more of items of specific information included in the plurality of luminaires, each of which has specific information, with two or more items of arrangement information among a plurality of items of arrangement information stored in the operation terminal; and (c) the above two or more items of specific information are two or more items of specific information inputted to the operation terminal.

Otherwise, a program satisfying the following conditions (d), (e) and (f) may be used: (d) the program causes a computer to execute a process for associating a plurality of luminaires with a plurality of items of arrangement information about the plurality of luminaires stored in an operation terminal for operating the luminaires; (e) the program causes the computer to execute a process for consecutively associating two or more of items of specific information included in the plurality of luminaires, each of which has specific information, with items of arrangement information about two or more luminaires for which association order is specified, in that order; and (f) the above two or more items of specific information are two or more items of specific information inputted to the operation terminal.

As will be apparent from the description of the first to third embodiments, by using these programs, it is possible to efficiently associate items of specific information about luminaires with items of arrangement information about the luminaires stored in an operation terminal and efficiently execute registration of the luminaires.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. An apparatus registration method for associating a plurality of luminaires with a plurality of pieces of arrangement information in layout information about the plurality of luminaires stored in an operation terminal operating the plurality of luminaires, the method comprising steps of:
   storing the layout information including the plurality of pieces of arrangement information of the plurality of luminaires into the operation terminal;
   consecutively reading, from the plurality of luminaires, a plurality of identifications using a reading apparatus, each of the plurality of identifications being included in a corresponding one of the plurality of luminaires; and
   after consecutively reading the plurality of identifications from the plurality of luminaires, consecutively associating the plurality of identifications read by the reading apparatus with the plurality of pieces of arrangement information in the layout information, wherein:
   a layout drawing in which a plurality of icons corresponding to the plurality of luminaires are arranged is displayed on an operation screen of the operation terminal,
   the plurality of identifications read by the reading apparatus are sent to the operation terminal, and
   after the plurality of identifications are sent to the operation terminal, the plurality of icons corresponding to the plurality of luminaires are selected in an order identical to an order of reading of the plurality of luminaires corresponding to the plurality of icons.

2. An apparatus registration method for associating a plurality of luminaires with a plurality of pieces of arrangement information in layout information about the plurality of luminaires stored in an operation terminal operating the plurality of luminaires, the method comprising steps of:
   storing the layout information including the plurality of pieces of arrangement information of the plurality of luminaires into the operation terminal;
   consecutively reading, from the plurality of luminaires, two or more identifications using a reading apparatus, each of the two or more identifications being included in a corresponding one of the plurality of luminaires; and
   after consecutively reading the two or more identifications from the plurality of luminaires, associating the two or more identifications read by the reading apparatus with two or more pieces of arrangement information about a same group constituted by two or more luminaires included among the plurality of luminaires, wherein:
   a layout drawing in which a plurality of icons corresponding to the plurality of luminaires are arranged is displayed on an operation screen of the operation terminal,
   the two or more identifications constituted by a part of a plurality of identifications of the plurality of luminaires and read by the reading apparatus are sent to the operation terminal, each of the two or more identifications being included in a corresponding one of the two or more luminaires belonging to the same group constituted by a part of the plurality of luminaires, and
   after the two or more identifications are sent, the two or more icons corresponding to the two or more luminaires belonging to the same group are selected.

3. The apparatus registration method according to claim 2, comprising a step of associating the two or more identifications with the group and an attribute of the group.

4. The apparatus registration method according to claim 1, comprising a step of, when the number of identifications read by the reading apparatus from the plurality of luminaires is larger than the number of the plurality of luminaires registered with the operation terminal, deleting one or more identifications among the read plurality of identifications,
   wherein the one or more identifications to be deleted is one or more identifications that has been read fewer times than other identifications during a reading operation of the plurality of identifications of the plurality of luminaires.

5. The apparatus registration method according to claim 2, comprising a step of, when the number of identifications read by the reading apparatus from the two or more luminaires is larger than the number of the two or more luminaires registered with the operation terminal, deleting one or more identifications among the read two or more identifications,
  wherein the one or more identifications to be deleted is one or more identifications that has been read fewer times than other identifications during a reading operation of the two or more identifications of the two or more luminaires.

6. The apparatus registration method according to claim 1, comprising a step of, when the number of identifications read by the reading apparatus from the plurality of luminaires is smaller than the number of the plurality of luminaires registered with the operation terminal, rereading the plurality of identifications information of each of the plurality of luminaries while confirming the number of times being read and inserting an identification that has not been read in a previous reading into the operation terminal.

7. The apparatus registration method according to claim 2, comprising a step of, when the number of identifications read by the reading apparatus from the two or more luminaires is smaller than the number of the two or more luminaires registered with the operation terminal, rereading the two or more identifications of the two or more luminaires while confirming the number of times being read and inserting an identification that has not been read in a previous reading into the operation terminal.

8. The apparatus registration method according to claim 1, wherein the reading apparatus comprises a supporting body provided with a stretchable structure.

9. The apparatus registration method according to claim 2, wherein the reading apparatus comprises a supporting body provided with a stretchable structure.

10. The apparatus registration method according to claim 1, wherein each of a plurality of pieces of apparatus information associated with the plurality of pieces of arrangement information in the layout information and including the plurality of identifications, includes information related to at least one of a piece of address information, a product number, a product name, a model number, a dimming curve, a color temperature/output range, or a color tone range.

11. The apparatus registration method according to claim 2, wherein each of two or more pieces of apparatus information associated with the two or more pieces of arrangement information in the layout information and including the two or more identifications, includes information related to at least one of a piece of address information, a product number, a product name, a model number, a dimming curve, a color temperature/output range, or a color tone range.

12. The apparatus registration method according to claim 10, wherein the operation terminal acquires the information related to at least one from a server on the Internet.

13. The apparatus registration method according to claim 11, wherein the operation terminal acquires the information related to at least one from a server on the Internet.

14. The apparatus registration method according to claim 1, wherein
  the operation terminal comprises a selection portion selecting, for each of the plurality of luminaires, a color temperature and an output for light radiated from a given luminaire.

15. The apparatus registration method according to claim 2, wherein
  the operation terminal comprises a selection portion selecting a color temperature and an output for same light radiated from the two or more luminaires belonging to the same group.

16. An apparatus system comprising:
  a plurality of luminaires; and
  an operation terminal with which the plurality of identifications about the plurality of luminaires are registered using the apparatus registration method according to claim 1.

17. An apparatus system comprising:
  a plurality of luminaires; and
  an operation terminal with which the two or more identifications about the two or more luminaires are registered using the apparatus registration method according to claim 2.

18. An apparatus system comprising:
  a plurality of luminaires; and
  an operation terminal with which the plurality of identifications about the plurality of luminaires are registered using the apparatus registration method according to claim 1,
  wherein the apparatus system is configured such that the plurality of luminaires are turned on at least once in order of the plurality of identifications being read.

* * * * *